United States Patent
Ryu et al.

(10) Patent No.: US 10,408,209 B2
(45) Date of Patent: Sep. 10, 2019

(54) COMPRESSOR AND METHOD FOR CONTROLLING THE SAME

(71) Applicant: LG ELECTRONICS INC., Seoul (KR)

(72) Inventors: Nayi Ryu, Seoul (KR); Min Gu, Seoul (KR)

(73) Assignee: LG Electronics Inc., Seoul (KR)

( * ) Notice: Subject to any disclaimer, the term of this patent is extended or adjusted under 35 U.S.C. 154(b) by 294 days.

(21) Appl. No.: 15/361,117

(22) Filed: Nov. 25, 2016

(65) Prior Publication Data
US 2017/0152850 A1    Jun. 1, 2017

(30) Foreign Application Priority Data
Nov. 27, 2015   (KR) .................. 10-2015-0167949

(51) Int. Cl.
*F04B 49/20* (2006.01)
*F04B 35/04* (2006.01)
(Continued)

(52) U.S. Cl.
CPC .............. *F04B 49/20* (2013.01); *F04B 35/04* (2013.01); *F04B 35/045* (2013.01);
(Continued)

(58) Field of Classification Search
CPC ...... F04B 2203/0401; F04B 2203/0402; F04B 2203/0404; F04B 49/20
See application file for complete search history.

(56) References Cited

U.S. PATENT DOCUMENTS

| | | | |
|---|---|---|---|
| 6,263,686 B1* | 7/2001 | Burkhart | F25D 21/008 62/155 |
| 2005/0031470 A1* | 2/2005 | Lee | F04B 35/045 417/416 |

(Continued)

FOREIGN PATENT DOCUMENTS

| | | |
|---|---|---|
| JP | H 11-351143 | 12/1999 |
| KR | 10-0761269 | 9/2007 |

(Continued)

OTHER PUBLICATIONS

Korean Office Action dated Dec. 28, 2017 issued in Application No. 10-2015-0167949.

(Continued)

*Primary Examiner* — Patrick Hamo
(74) *Attorney, Agent, or Firm* — KED & Associates, LLP

(57) ABSTRACT

Disclosed are a compressor applied to a refrigerator not having a cycle matching function or a refrigerator not including a controller, and capable of controlling a driving of a linear motor by the compressor itself, and a method for controlling the same. The compressor installed at an apparatus including a refrigeration cycle includes: a piston which reciprocates in a cylinder; a linear motor configured to provide a driving force to move the piston; a sensor configured to sense a motor current of the linear motor; and a compressor controller configured to detect information related to a load of the apparatus, in a separated manner from a controller which controls a body of the apparatus, wherein the compressor controller calculates a phase difference between a stroke of the piston and the sensed motor current, and wherein the compressor controller controls a driving of the linear motor in correspondence to the detected load, such that the calculated phase difference is within a range of a reference phase difference.

12 Claims, 16 Drawing Sheets

(51) Int. Cl.
  *F04B 39/00* (2006.01)
  *F25B 31/02* (2006.01)
  *F25B 49/02* (2006.01)
  *F04B 49/06* (2006.01)

(52) U.S. Cl.
  CPC ........ *F04B 39/0005* (2013.01); *F04B 49/065* (2013.01); *F25B 31/023* (2013.01); *F25B 49/022* (2013.01); *F25B 49/025* (2013.01); *F04B 2201/0201* (2013.01); *F04B 2203/0401* (2013.01); *F04B 2203/0402* (2013.01); *F25B 2400/073* (2013.01); *F25B 2500/19* (2013.01); *F25B 2600/021* (2013.01); *F25B 2700/21175* (2013.01); *Y02B 30/741* (2013.01)

(56) References Cited

U.S. PATENT DOCUMENTS

| | | |
|---|---|---|
| 2007/0241698 A1 | 10/2007 | Sung et al. |
| 2008/0131292 A1 | 6/2008 | Hong et al. |
| 2009/0004026 A1 | 1/2009 | Yoo et al. |
| 2015/0176579 A1* | 6/2015 | Lim ........................ F04B 35/04 62/230 |
| 2016/0053754 A1* | 2/2016 | Kang .................... F04B 35/045 417/45 |

FOREIGN PATENT DOCUMENTS

| | | |
|---|---|---|
| KR | 10-0801373 | 2/2008 |
| KR | 10-2008-0034962 | 4/2008 |
| KR | 10-0852676 | 8/2008 |
| KR | 10-0941422 | 2/2010 |
| KR | 10-2010-0104952 | 9/2010 |
| KR | 10-2015-0072167 | 6/2015 |
| KR | 10-2016-0024336 | 3/2016 |

OTHER PUBLICATIONS

International Search Report dated Sep. 4, 2017 issued in Application No. PCT/KR2016/014943.
Extended European Search Report dated May 29, 2019 issued in Application 16918999.0.

* cited by examiner

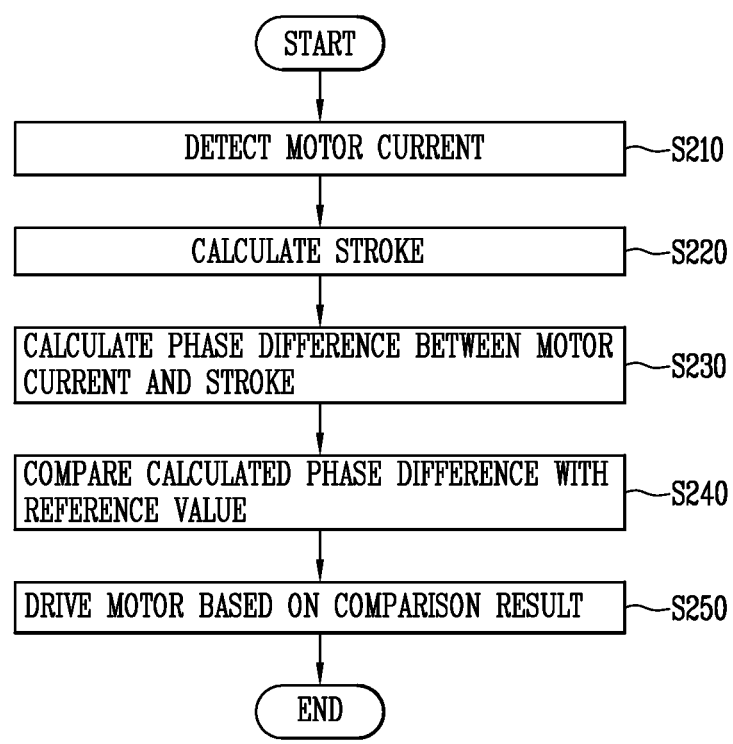

FIG. 4B
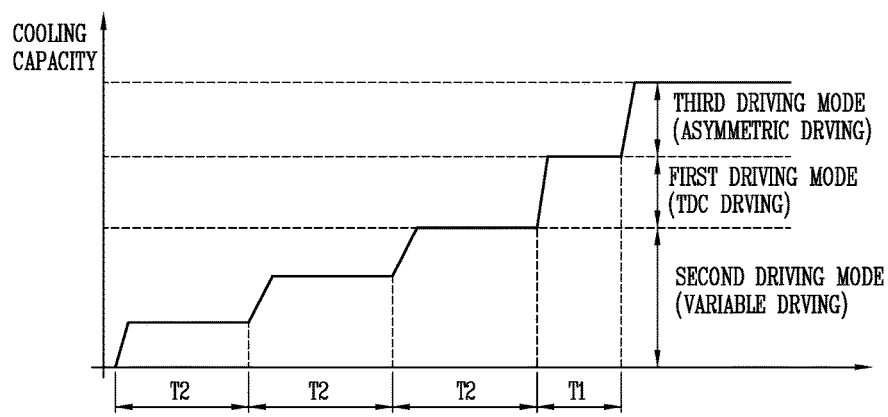
FIG. 4C
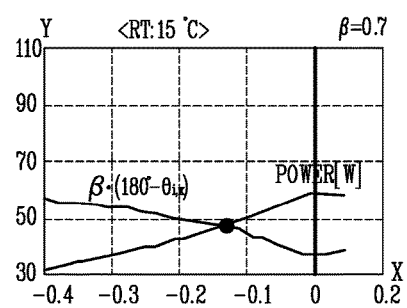
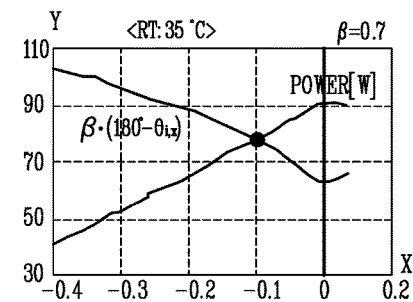
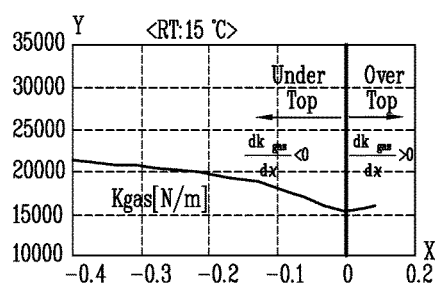
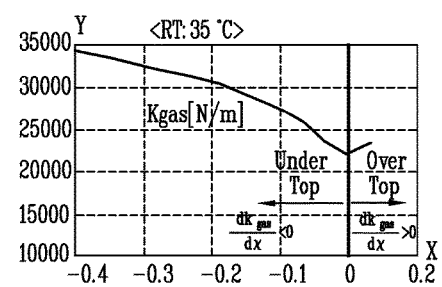

FIG. 8A
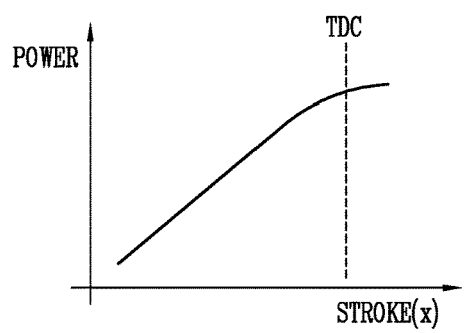
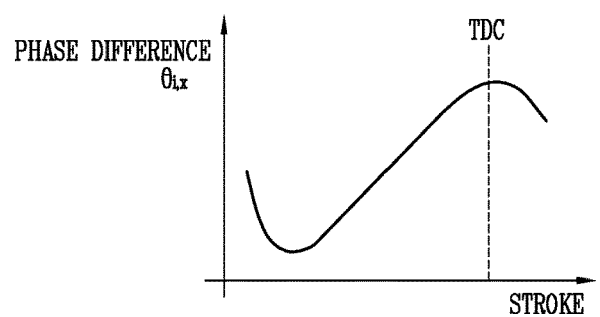
FIG. 8B
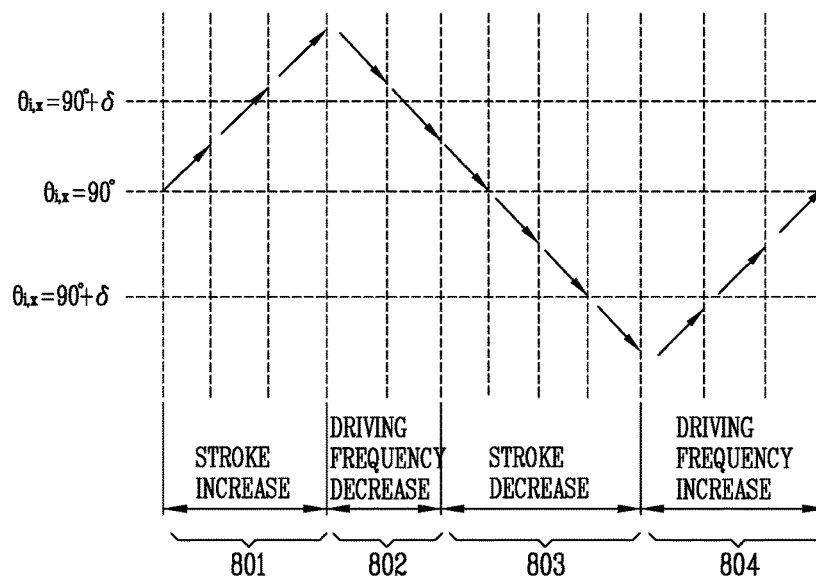

COMPRESSOR AND METHOD FOR CONTROLLING THE SAME

CROSS-REFERENCE TO RELATED APPLICATION

Pursuant to 35 U.S.C. § 119(a), this application claims the benefit of an earlier filing date of and the right of priority to Korean Application No. 10-2015-0167949, filed on Nov. 27, 2015, the contents of which are incorporated by reference herein in its entirety.

BACKGROUND

1. Field

This specification relates to a compressor and a method for controlling the same, and more particularly, a compressor which controls a motor thereof by generating a control signal related to a driving thereof by the compressor itself, and a method for controlling the same.

2. Background

In general, a compressor is an apparatus of converting mechanical energy into compression energy of compressible fluid, and constitutes a part of a refrigerating device, for example, a refrigerator, an air conditioner and the like.

Compressors are roughly classified into a reciprocating compressor, a rotary compressor, and a scroll compressor. The reciprocating compressor is configured such that a compression space for sucking and discharging operating gas is formed between a piston and a cylinder and a refrigerant is compressed as the piston linearly reciprocates in the cylinder. The rotary compressor is configured such that a compression space for sucking and discharging operating gas is formed between an eccentrically-rotatable roller and a cylinder and a refrigerant is compressed as the roller eccentrically rotates along an inner wall of the cylinder. The scroll compressor is configured such that a compression space for sucking and discharging operating gas is formed between an orbiting scroll and a fixed scroll and a refrigerant is compressed as the orbiting scroll rotates along the fixed scroll.

The reciprocating compressor sucks, compresses and discharges a refrigerant by linearly reciprocating the piston within the cylinder. The reciprocating compressor is classified into a recipro type and a linear type according to a method of driving the piston.

The recipro type refers to a type of reciprocating compressor of converting a rotary motion of a motor into a linear reciprocating motion by coupling the motor to a crankshaft and coupling a piston to the crankshaft. On the other hand, the linear type refers to a type of reciprocating compressor of reciprocating a piston using a linear motion of a linearly-moving motor by connecting the piston to a mover of the motor.

The reciprocating compressor includes a motor unit generating a driving force, and a compression unit compressing fluid by receiving the driving force from the motor unit. A motor is generally used as the motor unit, and specifically the linear type reciprocating compressor uses a linear motor.

The linear motor directly generates a linear driving force, and thus does not require for a mechanical conversion device and a complicated structure. Also, the linear motor can reduce a loss due to an energy conversion, and remarkably reduce noise by virtue of non-existence of a connection portion from which friction and abrasion are caused. Also, when the linear type reciprocating compressor (hereinafter, referred to as a linear compressor) is applied to a refrigerator or air condition, a compression ratio can vary by changing a stroke voltage applied to the linear compressor. Accordingly, the compressor can also be used for a control of varying a freezing capacity.

A compressor installed at a refrigerator may receive a control signal from a controller (or a refrigerator controller) installed at a refrigerator body, and may be driven according to the received control signal. That is, the refrigerator controller may control a driving cycle of a linear motor by applying a control signal to a driving unit or an inverter connected to the linear motor, in order to control a cooling capacity of the compressor.

Accordingly, in case of a cheap refrigerator not having such a controller (or a refrigerator controller) or a cheap refrigerator which cannot match a driving cycle of a linear motor, it is difficult to apply such a general compressor thereto.

In order to solve such a problem, required are a compressor capable of receiving only a control signal related to on/off thereof from the outside, and capable of generating a control signal related to a driving thereof, and a method for controlling the same. Further, required are a compressor which can be applied to a refrigerator not having a cycle matching function, and a method for controlling the same.

BRIEF DESCRIPTION OF THE DRAWINGS

The embodiments will be described in detail with reference to the following drawings in which like reference numerals refer to like elements wherein:

The accompanying drawings, which are included to provide a further understanding of the invention and are incorporated in and constitute a part of this specification, illustrate exemplary embodiments and together with the description serve to explain the principles of the invention.

In the drawings:

FIG. 1A is a block diagram illustrating a configuration of a compressor according to an embodiment of the present invention;

FIG. 1B is a block diagram illustrating a configuration of a refrigerator having a compressor according to the present invention;

FIG. 2 is a flowchart illustrating an embodiment related to a method for controlling a compressor according to the present invention;

FIGS. 3A and 3B are flowcharts illustrating an embodiment related to a method for controlling a compressor according to the present invention;

FIG. 3C is a graph illustrating variables related to the control method shown in FIG. 3A or 3B;

FIG. 3D is a flowchart illustrating an embodiment related to the control method shown in FIG. 3A;

FIG. 4A is a flowchart illustrating an embodiment related to a method for controlling a compressor according to the present invention;

FIGS. 4B and 4C are graphs illustrating variables related to the control method shown in FIG. 3A or 3B;

FIG. 4D is a graph illustrating variables related to a specific driving mode of a compressor shown in FIG. 4B;

FIG. 4E is a conceptual view illustrating a movement of a piston related to the graph shown in FIG. 4D;

FIG. 4F is a graph illustrating variables related to a specific driving mode of a compressor shown in FIG. 4B;

Figure 5A:
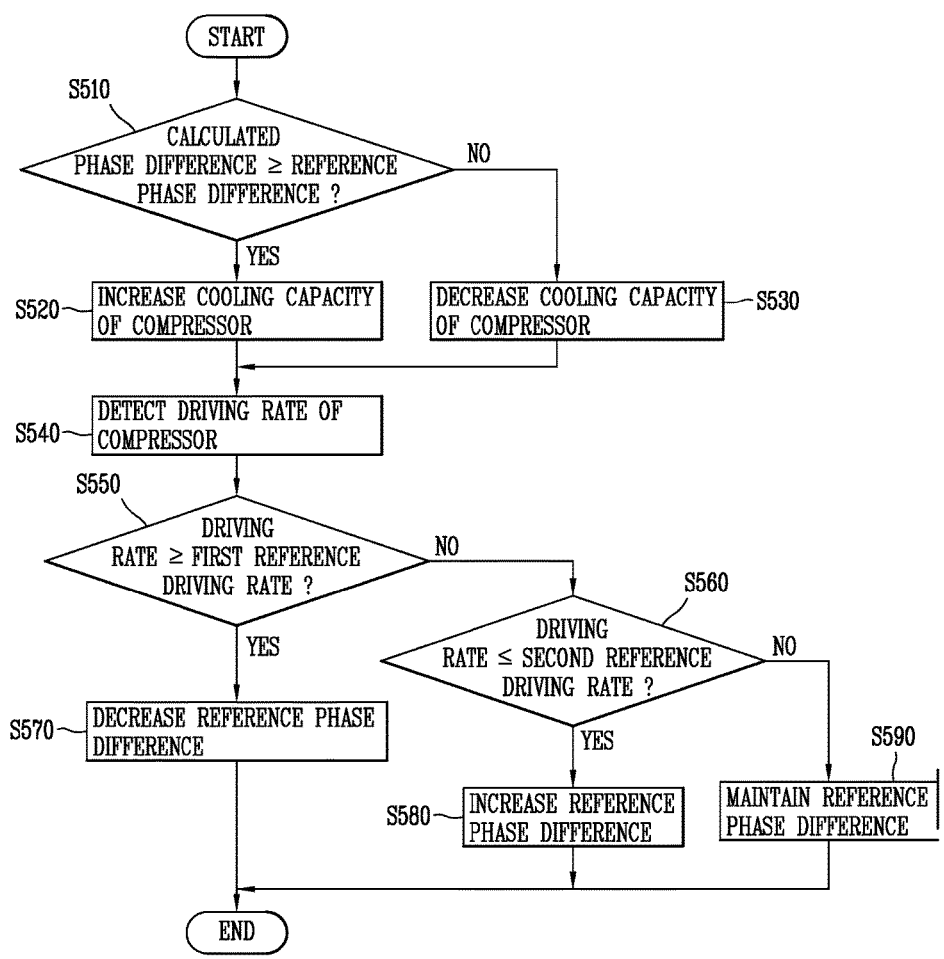
Figure 5B:
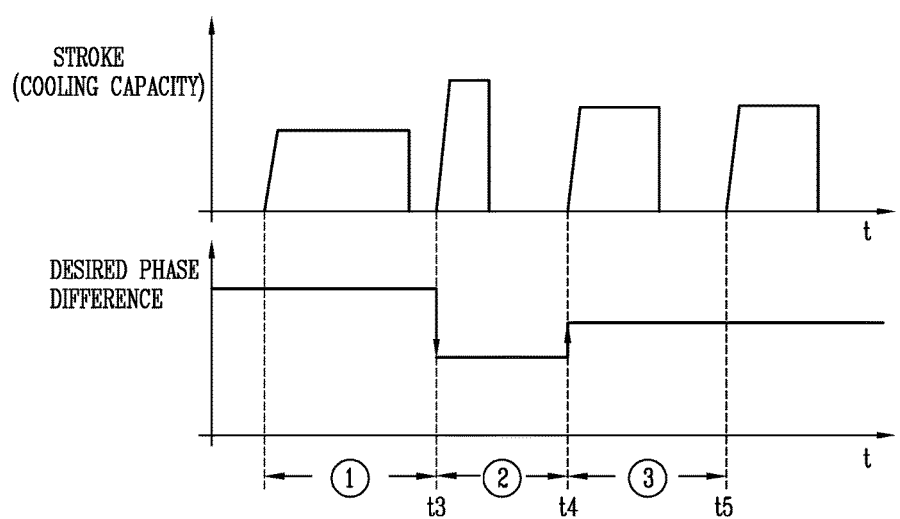
Figure 6:
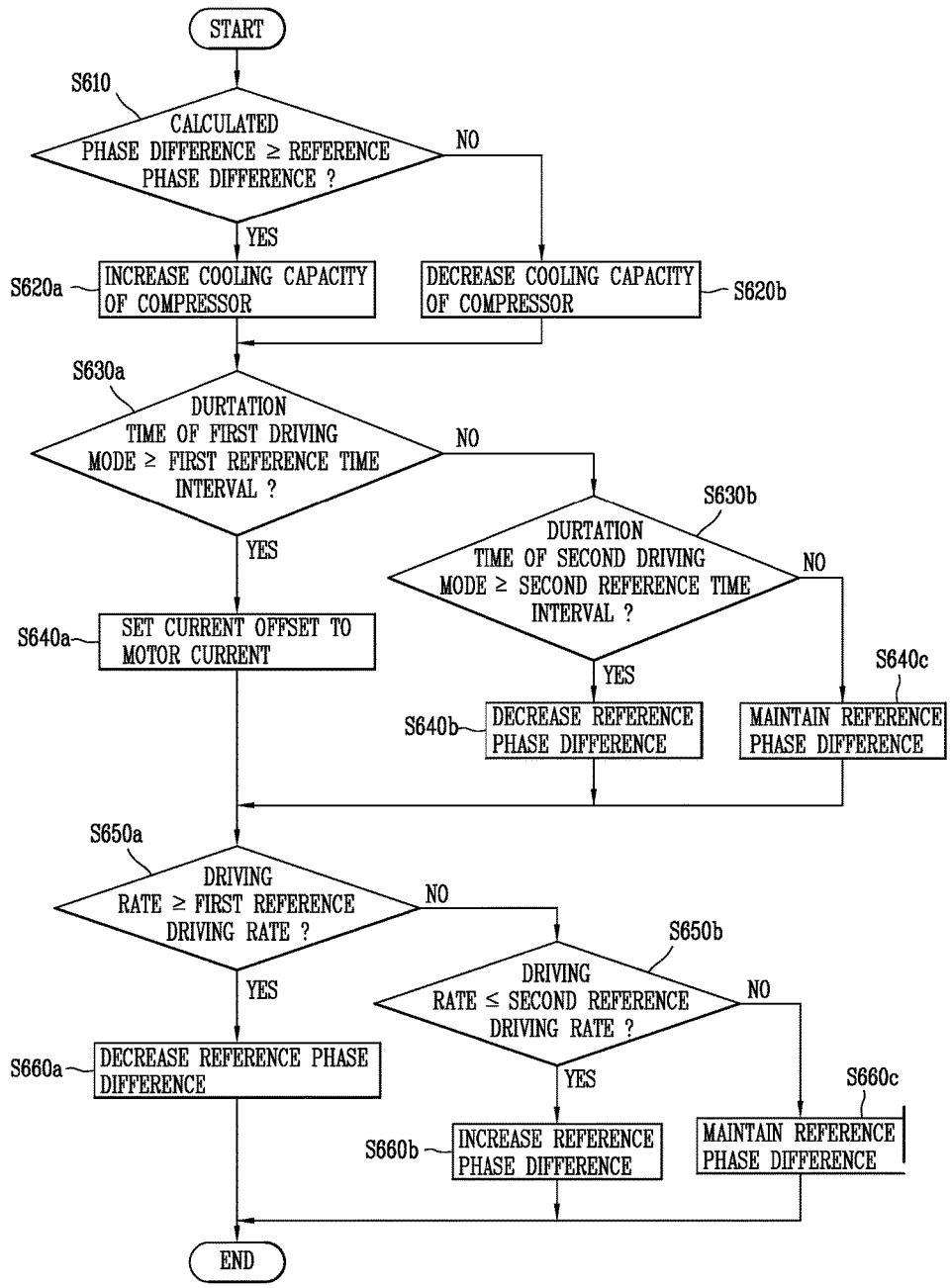
Figure 7:
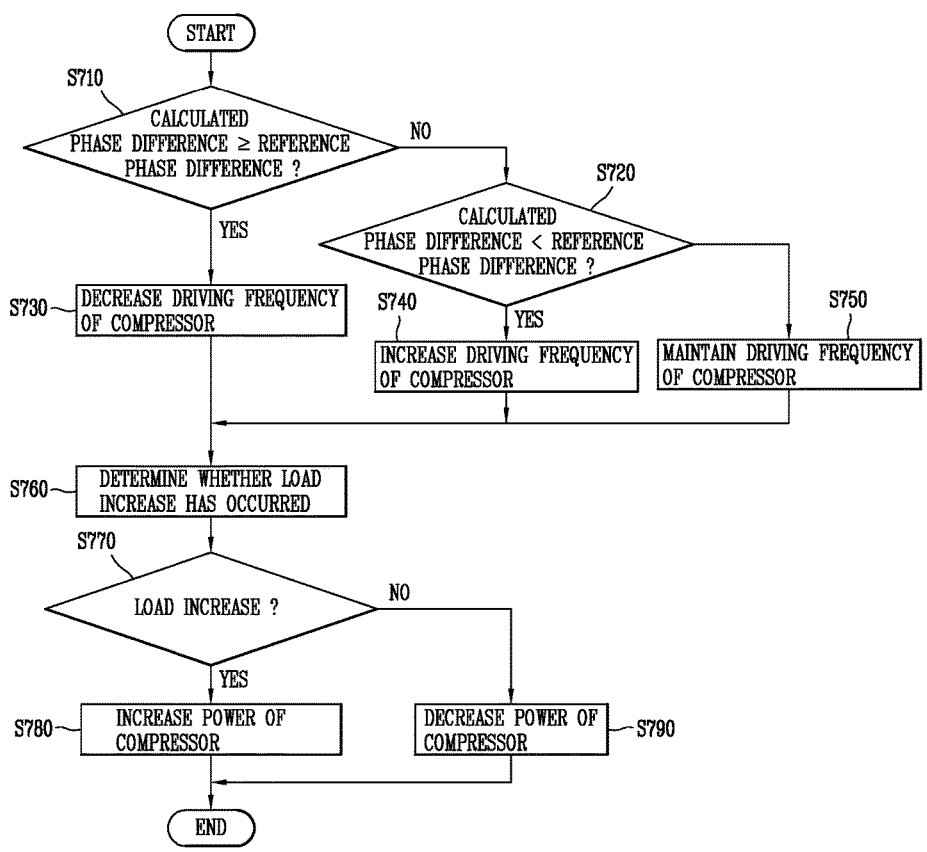
Figure 8C:
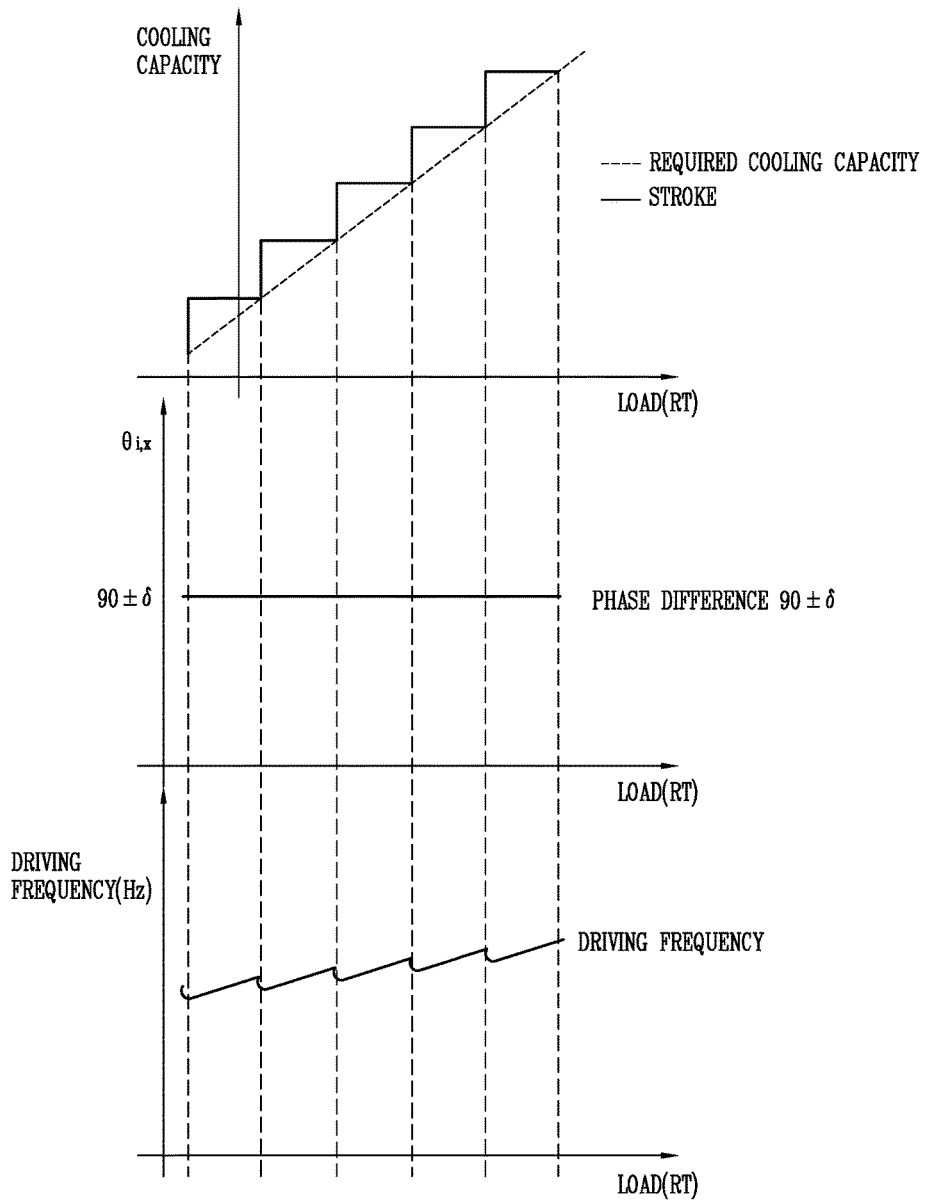

FIG. 5A is a flowchart illustrating an embodiment related to a method for controlling a compressor according to the present invention;

FIG. 5B is a graph illustrating variables related to the control method shown in FIG. 5A;

FIGS. 6 and 7 are flowcharts illustrating an embodiment related to a method for controlling a compressor according to the present invention; and FIGS. 8A to 8C are graphs illustrating variables related to the control method shown in FIG. 7.

DETAILED DESCRIPTION

The present invention may be applied to a compressor and a method for controlling the same. However, the present invention may be also applicable to all types of existing compressors, apparatuses for controlling a compressor, methods of controlling a compressor, apparatuses for controlling a motor, methods for controlling a method, apparatuses for testing noise of a motor, and methods for testing noise of a motor.

In describing the present invention, the detailed description will be omitted when a specific description for publicly known technologies to which the invention pertains is judged to obscure the gist of the present invention. The accompanying drawings are used to help easily understand various technical features and it should be understood that the embodiments presented herein are not limited by the accompanying drawings.

Figure 1A:
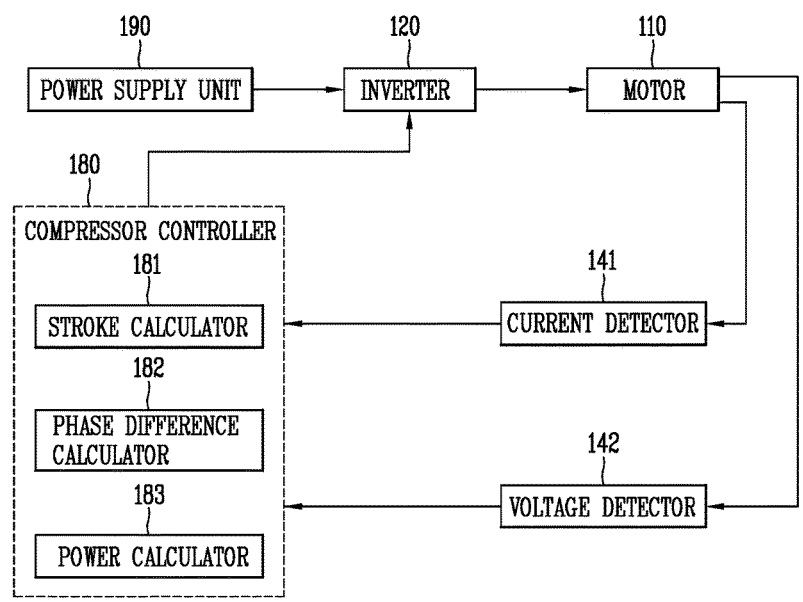

FIG. 1A is a block diagram illustrating a configuration of a compressor 100 according to an embodiment of the present invention.

As shown in FIG. 1A, the compressor 100 may include at least one of a motor 110, an inverter 120, a current detector 141, a voltage detector 142, a compressor controller 180, and a power unit 190.

More specifically, the motor 110 may be a linear motor configured to generate a linear driving force. The motor 110 may receive an input power from a driving unit.

For instance, the driving unit may include the inverter 120. The inverter 120 may be implemented as a full-bridge type inverter module.

The full-bridge type inverter module may include a plurality of switching devices. In an embodiment, the inverter 120 may include 4 switching devices (not shown). And the full-bridge type inverter module may further include diodes (not shown), free wheels connected to the 4 switching devices in parallel.

The switching device may be at least one of an insulated gate bipolar transistor (IGBT), a MOSFET and a BJT.

The compressor controller 180 may generate a control signal by a pulse width modulation (PWM) method, and output the generated control signal to the inverter 120.

The PWM method will be explained as follows. In order to set a direction of a current from the motor 110, the compressor controller 180 may turn on some of a plurality of switches, and turn off the remaining switches.

The compressor controller 180 may use two types of signals in order to modulate a pulse width of a control signal for driving the motor 110. In this case, the two types of signals may be a carrier signal and a reference signal.

The carrier signal may be formed as a triangular wave, and the reference signal of a sine wave may serve as a command for controlling the inverter 120.

In an embodiment, the reference signal may be a table voltage output with a constant frequency under a sine table. That is, the reference signal may have a sine waveform at a periodic discrete time region. Thus, the compressor controller 180 may control the motor 110 by controlling a size of the reference signal, a shape of the reference signal, and a DC average value (or a DC offset value).

Thus, the compressor controller 180 may generate a control signal to turn on the switching devices when the reference signal is larger than the carrier signal, and may generate a control signal to turn off the switching devices when the reference signal is smaller than the carrier signal.

If the compressor controller 180 increases the reference signal or a voltage command, a region where the reference signal is larger than the carrier signal is increased, and thus a time duration for which the switching devices are turned on is increased. This may increase a motor voltage or a motor current applied to the motor 110.

Although not shown in FIG. 1A, this specification describes an apparatus for controlling a compressor using a triac.

The apparatus for controlling a compressor using a triac serves to control the motor 110 which controls a cooling capacity by changing a stroke by a stroke voltage due to a stroke command, as a piston moves up and down. Here, the compressor controller 180 may control a motor voltage applied to the motor 110 by cutting off the triac using an alternating current power.

More specifically, the compressor may include the voltage detector 142 configured to detect a voltage applied to the motor 110, and the current detector 141 configured to detect a current applied to the motor 110.

Alternatively, the compressor may include the compressor controller 180 configured to calculate a stroke based on a voltage and a current detected by the voltage detector 142 and the current detector 141, to compare the calculated stroke with a stroke command, and to output a switching control signal according to a comparison result. And the compressor may further include a driving unit configured to apply a predetermined motor voltage to the motor 110 by cutting off the triac using an alternating current power according to a switching control signal of the compressor controller 180.

The current detector 141, the voltage detector 142 and the compressor controller 180 may be implemented as a single controller (one-chip).

An operation of the apparatus for controlling a compressor using a triac will be explained.

Firstly, as the motor 110 may linearly move the piston by a motor voltage corresponding to a stroke command set by a user, a stroke is changed. This may control a cooling capacity of the compressor.

Once a turn-on period of a triac is increased by a switching control signal of the compressor controller 180, a stroke of the compressor is increased. In this case, a motor voltage and a motor current applied to the motor 110 may be detected by the voltage detector 142 and the current detector 141, respectively, and information on the detected motor voltage and motor current may be transmitted to the compressor controller 180.

Then, the compressor controller 180 may calculate a stroke based on the motor voltage and the motor current detected by the voltage detector 142 and the current detector 141, may compare the calculated stroke with a stroke command, and may output a switching control signal according to a comparison result.

That is, if the calculated stroke is smaller than the stroke command, the compressor controller 180 may increase a motor voltage applied to the motor 110 by outputting a switching control signal which increases the turn-on period of the triac.

As shown in FIG. 1A, the compressor controller 180 may include at least one of a stroke calculator 181, a phase difference calculator 182 and a power calculator 183. In one embodiment, each of the stroke calculator 181, the phase difference calculator 182 and the power calculator 183 may be formed as an independent module. In another embodiment, the stroke calculator 181, the phase difference calculator 182 and the power calculator 183 may be components corresponding to the compressor controller 180.

The stroke calculator 181 may receive information on a motor current detected by the current detector 141 and a motor voltage detected by the voltage detector 142, and may detect information related to a stroke of the motor 110 based on the received information. That is, the stroke calculator 181 may detect a stroke indicating a position change of a piston of the motor 110, based on at least one of the motor current and the motor voltage.

The stroke calculator 181 may calculate a stroke value or a stroke estimation value of the motor 110, by applying the motor current, the motor voltage and a motor parameter to the following formula 1.

$$x = \frac{1}{\alpha} \int \left(V_m - Ri_m - L\frac{di_m}{dt}\right) dt \quad \text{[Formula 1]}$$

Here, R denotes a resistance, L denotes an inductance, a denotes a motor constant or a counter electromotive force constant.

The phase difference calculator 182 may calculate a phase difference between a stroke calculated by the stroke calculator 181 and a motor current detected by the current detector 141, or a phase difference between the stroke calculated by the stroke calculator 181 and a motor voltage detected by the voltage detector 142. For instance, the phase difference calculator 182 may calculate a phase difference between a motor current phase and a stroke phase, or may calculate a phase difference between a motor voltage phase and a stroke phase.

The power calculator 183 may calculate a power consumed by the motor 110, based on at least one of a motor current and a motor voltage.

Figure 1B:
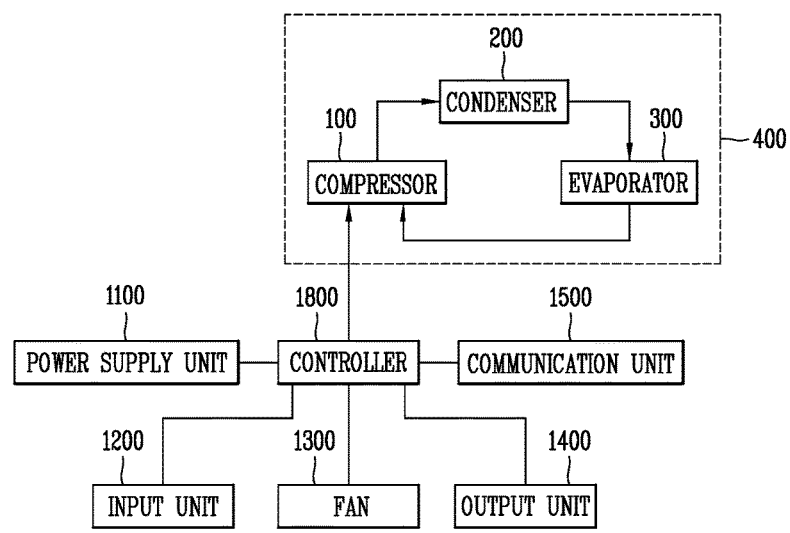

FIG. 1B illustrates components of a refrigerator having a refrigeration cycle as a general apparatus having a refrigeration cycle. However, the present invention is not limited to a refrigerator, but may be applied to various apparatuses each including a refrigeration cycle. Especially, a cheap apparatus may not be provided with some of components to be explained later.

As shown in FIG. 1B, a compressor 100, a condenser 200 and an evaporator 300 may form a refrigeration cycle 400. A plurality of refrigeration cycles 400 may be formed at a single apparatus, and each of the plurality of refrigeration cycles 400 may include the compressor. Alternatively, the plurality of refrigeration cycles 400 may commonly use the single compressor.

The refrigerator having a refrigeration cycle 400 may include at least one of a power supply unit 1100, an input unit 1200, an output unit 1400, a communication unit 1500, a fan 1300 and a controller 1800. It is understood that implementing all of the components illustrated in FIG. 1B is not a requirement, and that greater or fewer components may alternatively be implemented.

More specifically, the refrigeration cycle 400 may include at least one of a compressor, a condenser, an evaporator, a drier, a capillary tube and a hot line. The compressor of the refrigeration cycle 400 may circulate a refrigerant in the refrigeration cycle 400.

For instance, the refrigeration cycle 400 may include a single compressor, a single condenser and a single evaporator.

As another example, the refrigeration cycle 400 may include a single compressor, a single condenser and a plurality of evaporators. In this case, the plurality of evaporators may be connected to each other in parallel.

As another example, the refrigeration cycle 400 may include a first refrigerant cycle, and a second refrigerant cycle independent from the first refrigerant cycle. In this case, each of the first and second refrigerant cycles may include a compressor, a condenser, an evaporator, etc. Here, one of the first and second refrigerant cycles may include a hot line.

The communication unit 1500 may include one or more modules which execute a wired or wireless communication between the refrigerator and a wired or wireless communication system, or between the refrigerator and a network of the refrigerator. The communication unit 1500 may include one or more of a broadcast receiving module, a wireless Internet module, a short-range communication module and a location information module.

The wireless Internet module included in the communication unit 1500 means a module for wireless internet access, and may be mounted inside or outside the refrigerator. Examples of such wireless Internet access may include Wireless LAN (WLAN), Wireless Fidelity (Wi-Fi), Wireless Broadband (WiBro), Worldwide Interoperability for Microwave Access (WiMAX), High Speed Downlink Packet Access (HSDPA) and the like.

The short-range communication module included in the communication unit 1500 means a module for short-range communications. Suitable technologies for implementing such short-range communications include BLUETOOTH™, Radio Frequency IDentification (RFID), Infrared Data Association (IrDA), Ultra-WideBand (UWB), ZigBee, and the like.

The location information module included in the communication unit 1500 is a module for checking or acquiring a location (or position) of the refrigerator. For example, the location information module may include a GPS (Global Positioning System) module that receives location information from a plurality of satellites. Here, the location information may include coordinate information represented by latitude and longitude values. For example, the GPS module may measure an accurate time and distance from three or more satellites, and accurately calculate a current location of the refrigerator according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. Furthermore, the GPS module may acquire speed information by real time calculating a current position.

The communication unit 1500 may receive data from a user, and may transmit information processed by the controller 1800 of the refrigerator, information sensed by a sensing unit, etc., to an external terminal (not shown).

The sensing unit may sense an inner temperature or an external temperature of a storage chamber of the refrigerator, an open state of a door or a home bar of the refrigerator, etc.

More specifically, the sensing unit may include a sensor configured to sense a temperature of at least one of an inlet and an outlet of an evaporator.

The sensing unit may include at least one sensor attached to one inner surface of a refrigerating chamber of the refrigerator, at least one sensor attached to one inner surface of a freezing chamber of the refrigerator, and at least one sensor attached to one surface among outer wall surfaces of the refrigerator so as to sense an external temperature. Further, the sensing unit may include a sensor configured to sense whether a compressor has been driven or not and to sense a cooling capacity of the compressor. Information sensed by the sensing unit may be transmitted to the controller 1800 of the refrigerator.

The fan 1300 may include a cooling fan configured to supply cool air to the inside of the refrigerator, a radiation fan disposed in a mechanical chamber in order to radiate a refrigerant which passes through a refrigerant cycle, etc. An on/off state or an output setting of the fan 1300 may be controlled by the controller 1800 of the refrigerator.

The input unit 1200 is configured to receive a user input to control an operation of the refrigerator or to check a state of the refrigerator, and to output a signal corresponding to the user input. And the input unit 1200 may be implemented in the form of a button or a touch pad.

More specifically, the input unit 1200 may be implemented in the form of a touch screen on a display of the output unit 1400 of the refrigerator. The input unit 1200 may further include a camera module configured to capture an image of food to be stored in the refrigerator, or to capture an image of a bar code or a QR code attached to the food. The input unit 1200 may further include a microphone configured to input an audio such as a user's voice.

A memory 160 may store therein information related to the refrigerator, e.g., a program for driving the refrigerator, information set to drive the refrigerator, an application of the refrigerator, state information of the refrigerator, recipe information, information on food being stored in the refrigerator, user information, multimedia content, etc. And the memory may include icons or graphic data for visually displaying such information.

The memory 160 may store therein data related to a cooling capacity of the compressor. For instance, the data related to a cooling capacity of the compressor may include at least one of data related to a cooling capacity initial value when the refrigerator is initially driven, and data related to a cooling capacity initial value when the refrigerator is driven again.

The memory 160 may store therein at least one of information about an installation position of the refrigerator, information about one or more terminals (not shown) which are to collect a position of the refrigerator, and information about access to a server (not shown). More specifically, in a case where a plurality of terminals are registered, the memory 160 may also store therein information about a priority such as a master or a slave.

An output unit 170 configured to display information about the refrigerator, etc. visually or audibly may include a plane display and a speaker. More specifically, the plane display may be formed as a touch panel for receiving a user's touch input.

The plane display of the output unit 170 may display a user interface (UI) or a graphic user interface (GUI) related to a driving of the refrigerator. More specifically, the display may include at least one of a liquid crystal display, a thin film transistor-liquid crystal display, an organic light-emitting diode, a flexible display and a 3D display. The display may be formed in at least two according to a configuration of the refrigerator. For instance, a first display may be provided on one surface of a refrigerating chamber door of the refrigerator, and a second display may be provided on one surface of a freezing chamber door of the refrigerator.

When the display has an inter-layered structure with a touch sensor in order to facilitate a touch screen, the display may be used as an input device as well as an output device. The touch sensor may be formed as a touch film, a touch sheet, a touch pad, etc.

The touch sensor may be configured to convert changes of pressure applied to a specific part of the display, or convert capacitance occurring at a specific part of the display, into electric input signals. The touch sensor may also be configured to sense not only a touched position and a touched area, but also touch pressure. When a touch input is sensed by the touch sensor, corresponding signals may be transmitted to a touch controller. The touch controller may process the received signals, and then transmit corresponding data to the controller 1800. Accordingly, the controller 1800 of the refrigerator may sense which region of the display has been touched.

The power supply unit 1100 may receive an external power and an internal power by the controller 1800 of the refrigerator, thereby supplying a required power to each of the components.

The controller 1800 controls an entire operation of the refrigerator. For instance, the controller 1800 executes controls and processes related to a freezing driving, a refrigerating driving, a pause driving, a maximum output driving, etc.

The controller 1800 controls each component of the refrigerator according to a user's request and/or a set condition, and may have therein a system memory (not shown) which provides a space for storing data necessary to a control operation, an environment setting, an execution process, etc. And the controller 1800 may include an operation system (not shown) which drives hardware resources of the refrigerator and exchange the resources with a proper signal and/or information, by executing command codes such as firmware.

An operation of the controller 1800 of the refrigerator, or an operation of an application executed thereby is executed by an intermediation operation of the operation system, and explanations of the intermediation operation will be omitted.

FIGS. 1A and 1B illustrate embodiments of an apparatus having a refrigeration cycle, and a compressor installed in the apparatus.

The compressor controller 180 may receive a stroke command from the controller of the apparatus having a refrigeration cycle including the compressor, and may compare the stroke command with a stroke value calculated according to the above formula 1 or a stroke estimation value. In this case, the compressor controller 180 may change a voltage applied to the motor 110 based on a difference between the stroke value (or the stroke estimation value) and the stroke command, thereby controlling a stroke.

However, in a case where the apparatus having a refrigeration cycle does not include a controller, the compressor controller 180 cannot receive information on a stroke command. As a result, it is impossible to control a stroke by comparing the stroke command with the stroke value calculated according to the above formula 1.

Further, even in a case where the apparatus having a refrigeration cycle includes a controller, the controller cannot transmit information related to a stroke command to the compressor controller 180.

In a case where the apparatus having a refrigeration cycle includes a controller not provided with a cycle matching function, the controller cannot generate a stroke command. As a result, the compressor controller 180 receives only a signal related to on/off of the compressor from the controller of the apparatus, without receiving information related to a stroke command. That is, since the compressor controller 180 cannot receive information related to a stroke command, it is impossible to control a stroke by comparing the stroke command with the stroke value calculated according to the above formula 1.

Accordingly, the present invention provides embodiments of a compressor included in a cheap apparatus having a reciprocation cycle, and capable of receiving only a signal to turn on/off the compressor from a controller of the apparatus, detecting information related to a load of the apparatus, and performing a driving according to the detected load.

FIG. 2 is a flowchart illustrating an embodiment related to a method for controlling a compressor according to the present invention.

Referring to FIG. 2, the current detector 141 included in the compressor may detect a motor current (S210). Then, the compressor controller 180 may calculate a stroke of the motor 110 (S220).

More specifically, the current detector 141 may detect a motor current at predetermined time intervals, and the compressor controller 180 may calculate a stroke based on the motor current detected at the predetermined time intervals. The predetermined time intervals may be changed according to a design. Thus, the compressor controller 180 may real time calculate a stroke of the piston.

Although not shown in FIG. 2, the compressor controller 180 may calculate a stroke based on a motor voltage detected by the voltage detector 142 at predetermined time intervals. And the compressor controller 180 may calculate a stroke estimation value based on a motor current, a motor voltage and a motor parameter.

In this case, the stroke calculated by the compressor controller 180 may be an estimation value with respect to the stroke of the piston. Thus, the stroke value calculated by the compressor controller 180 may correspond to a substantial position of the piston, or may be very similar thereto.

More specifically, the compressor controller 180 may calculate a stroke through the above formula 1 and by the following method.

The compressor controller 180 may calculate a phase difference between a motor current and a stroke (S230).

The compressor controller 180 may use the calculate phase difference (θ) as a parameter for controlling the compressor. The compressor controller 180 may convert the calculated phase difference (θ) into another phase difference (θ'), thereby controlling the compressor based on the converted phase difference (θ'). For instance, the converted phase difference (θ') may be a value obtained by deducting the calculated phase difference (θ) from 180°.

Although not shown in FIG. 2, the compressor controller 180 may calculate a phase difference between a motor voltage and a stroke.

And the compressor controller 180 may compare the calculated phase difference with a reference phase difference (S240). Here, the reference phase difference may correspond to a desired phase difference between a motor current and a stroke, or a desired phase difference between a motor voltage and a stroke. A memory of the compressor may pre-store therein information about the reference phase difference. The reference phase difference may be reset by a user input.

The compressor controller 180 may drive the motor based on a comparison result obtained in S240 (S250).

More specifically, if the calculated phase difference is larger than the reference phase difference, the compressor controller 180 may determine that a load of the compressor is large (or has been increased).

If it is determined that the load of the compressor is large (or has been increased), the compressor controller1 180 may increase a cooling capacity of the compressor.

The cooling capacity of the compressor may be defined according to a distance between a bottom dead center (BDC) and a top dead center (TDC) of the piston which is performing a linear reciprocation. Alternatively, the cooling capacity of the compressor may be defined according to a driving frequency of the motor, or according to a power applied to the motor.

If the calculated phase difference is smaller than the reference phase difference, the compressor controller 180 may determine that the load of the compressor is small (or has been decreased). In this case, the compressor controller 180 may decrease the cooling capacity of the compressor.

Figure 3A:
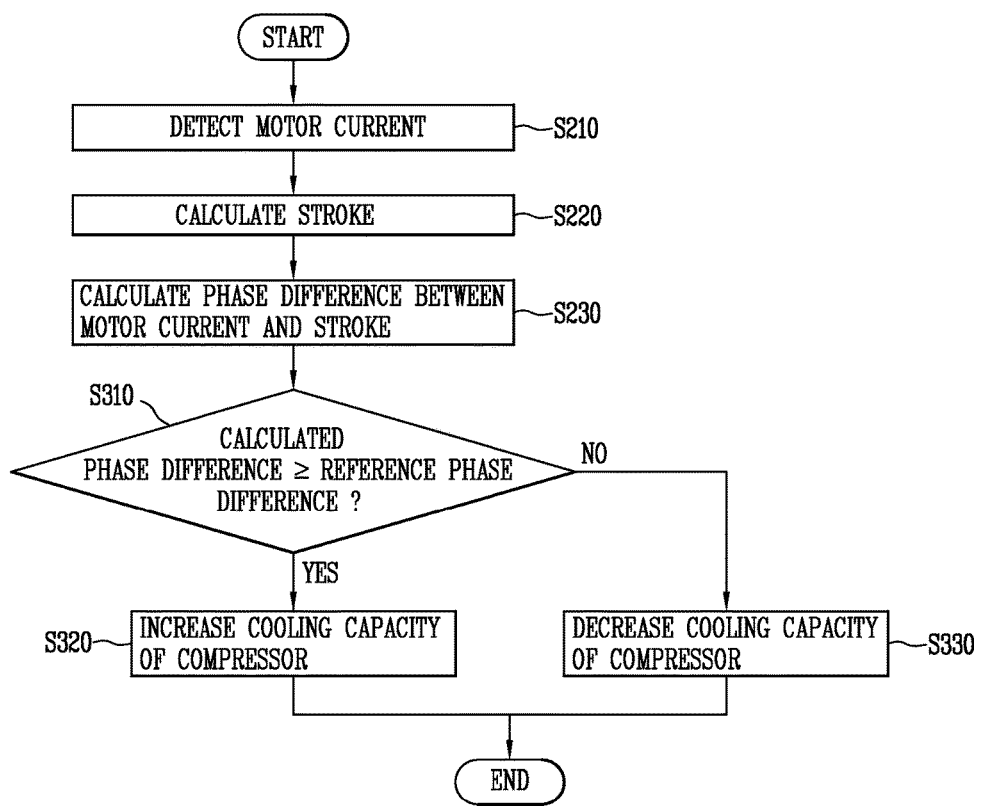
Figure 3B:
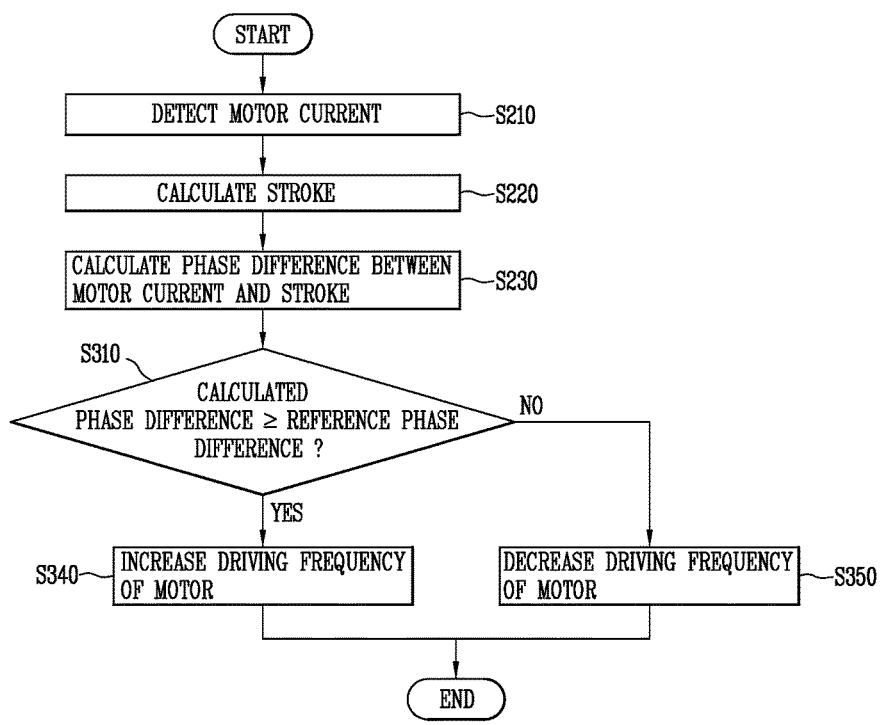

FIGS. 3A and 3B are flowcharts illustrating an embodiment related to a method for controlling a compressor according to the present invention.

Similar to FIG. 2, in FIG. 3A, the compressor controller 180 may detect at least one of a motor current and a motor voltage (S210), calculate a stroke based on the detected motor voltage and motor current (S220), and calculate a phase difference between the motor current or the motor voltage and the stroke (S230).

Referring to FIG. 3A, if the calculate phase difference is larger than a reference phase difference, the compressor controller 180 may drive a linear motor such that a cooling capacity of the compressor may be increased (S320). On the other hand, if the calculate phase difference is smaller than the reference phase difference, the compressor controller 180 may drive the linear motor such that the cooling capacity of the compressor may be decreased (S330).

More specifically, the compressor controller 180 may increase the cooling capacity of the compressor (S320) or decrease the cooling capacity of the compressor (S320), by controlling a stroke of the piston.

For instance, if the calculated phase difference is larger than the reference phase difference, the compressor controller 180 may increase the stroke of the piston such that the cooling capacity of the compressor may be increased. That is, if the calculated phase difference is larger than the reference phase difference, the compressor controller 180 may control the linear motor such that a maximum value of the stroke may be increased.

In another embodiment, if the calculated phase difference is smaller than the reference phase difference, the compressor controller 180 may decrease the stroke of the piston such that the cooling capacity of the compressor may be decreased. That is, if the calculated phase difference is smaller than the reference phase difference, the compressor controller 180 may control the linear motor such that the maximum value of the stroke may be decreased.

The compressor controller 180 may change the cooling capacity of the compressor according to a gap between the calculated phase difference and the reference phase difference. That is, if the gap between the calculated phase difference and the reference phase difference is large, the compressor controller 180 may increase a change width of the cooling capacity. On the other hand, if the gap between the calculated phase difference and the reference phase difference is small, the compressor controller 180 may decrease the change width of the cooling capacity.

If the changed cooling capacity is larger than a cooling capacity upper limit value, the compressor controller 180 may drive the linear motor such that the cooling capacity of the compressor may correspond to the cooling capacity upper limit value.

If the changed cooling capacity is smaller than a cooling capacity lower limit value, the compressor controller 180 may drive the linear motor such that the cooling capacity of the compressor may correspond to the cooling capacity lower limit value.

As shown in FIG. 3B, the compressor controller 180 may change a driving frequency of the motor in order to change the cooling capacity of the compressor.

More specifically, if the calculated phase difference is larger than the reference phase difference, the compressor controller 180 may decrease a driving frequency of the linear motor such that the cooling capacity of the compressor may be increased (S340).

On the other hand, if the calculated phase difference is smaller than the reference phase difference, the compressor controller 180 may increase the driving frequency of the linear motor such that the cooling capacity of the compressor may be decreased (S340).

Figure 3C:
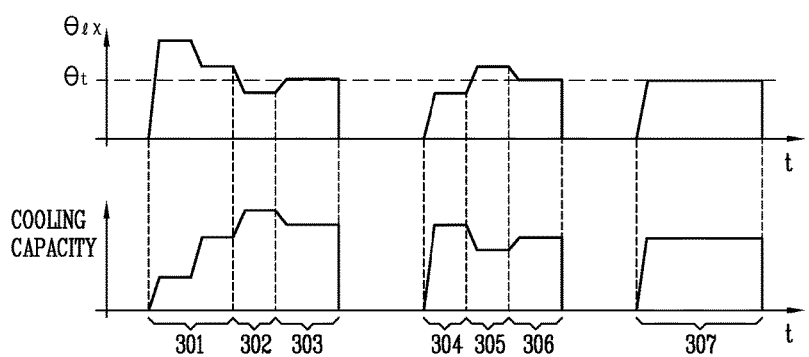

FIG. 3C is a graph illustrating variables related to the control method shown in FIG. 3A or 3B.

FIG. 3C illustrates a change of variables used to control the compressor by the compressor controller, according to time. For instance, the variable (θlx) may be a phase difference between a motor current and a stroke, or a phase difference between a motor voltage and a stroke. As shown in FIGS. 3A and 3B, the compressor controller may control the cooling capacity of the compressor by comparing the variable (θlx) corresponding to a calculated phase difference, with a reference phase difference (θt).

As shown in FIG. 3C, the compressor controller 180 may increase the cooling capacity of the compressor at sections (301, 305) where the calculated phase difference is larger than the reference phase difference (θt). More specifically, the compressor controller 180 may increase the cooling capacity of the compressor, from a time point when it is determined that the calculated phase difference is larger than the reference phase difference (θt). The compressor controller 180 may compare the calculated phase difference with the reference phase difference (θt) at preset time intervals. That is, the compressor controller 180 may increase the cooling capacity of the compressor after the time points (301, 305) where the calculated phase difference is greater than the reference phase difference (θt).

The compressor controller 180 may decrease the cooling capacity of the compressor at sections 302, 304 where the calculated phase difference is smaller than the reference phase difference (θt). The compressor controller 180 may maintain the cooling capacity of the compressor at sections 303, 306, 307 where the calculated phase difference is equal to the reference phase difference (θt).

Figure 3D:
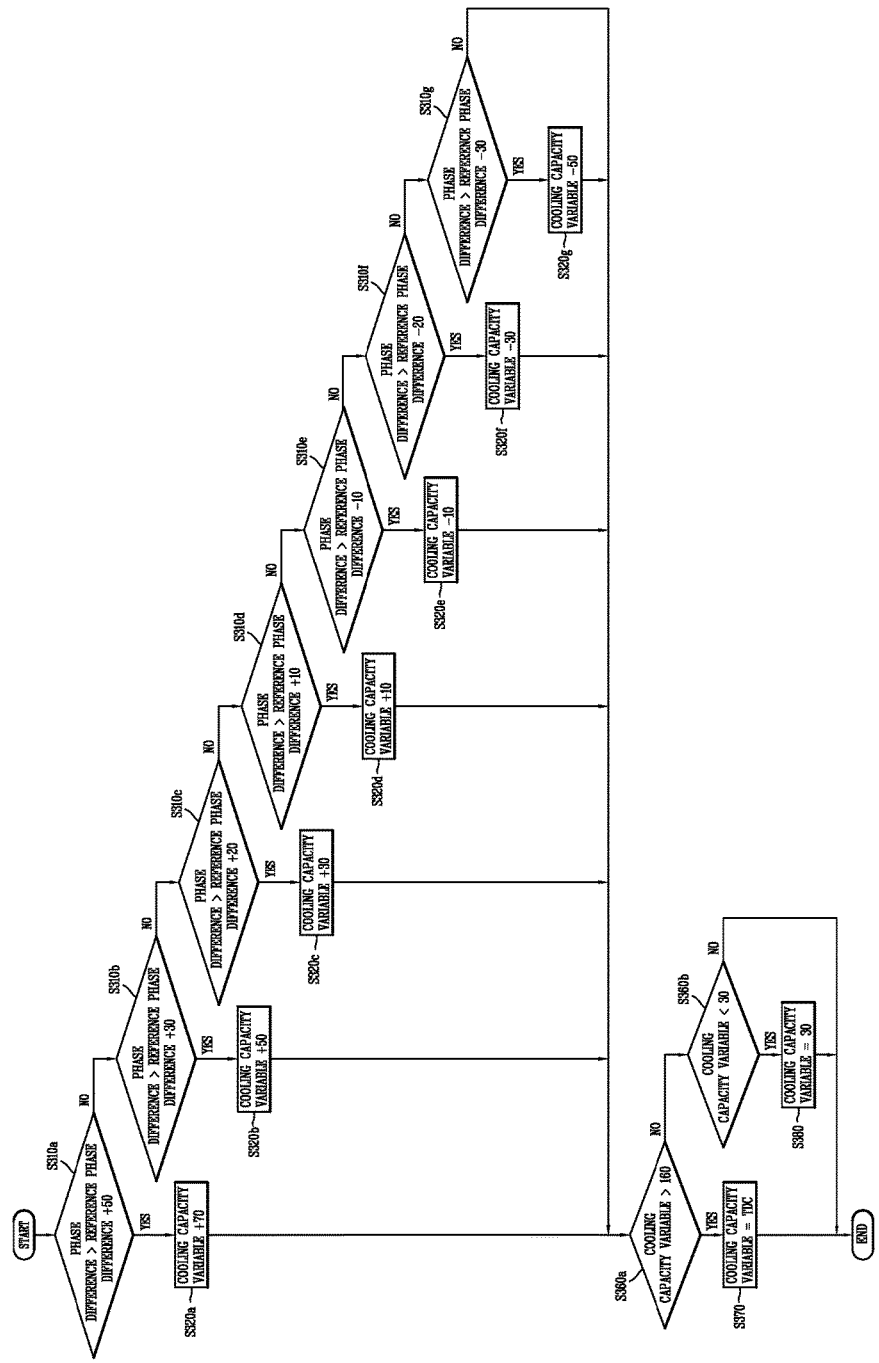

Referring to FIG. 3D, the compressor controller 180 may change the cooling capacity of the compressor according to a gap between the calculated phase difference and the reference phase difference.

A cooling capacity variable shown in FIG. 3D is a value used to control the cooling capacity of the compressor by the compressor controller 180. If the cooling capacity variable is increased, the cooling capacity of the compressor may be increased, and a stoke (stroke) of the piston may be increased. On the other hand, if the cooling capacity variable is decreased, the cooling capacity of the compressor may be decreased, and the stoke (stroke) of the piston may be decreased.

As shown in FIG. 3D, the compressor controller 180 may compare a phase difference between a motor current and a stroke, with a plurality of reference phase differences (S310*a*, S310*b*, S310*c*, S310*d*, S310*e*, S310*f*, S310*g*). When a gap between the phase difference and each of the reference phase differences is large, the compressor controller 180 may increase a change width of the cooling capacity variable. Based on such a change width, the cooling capacity variable may be changed (S320*a*, S320*b*, S320*c*, S320*d*, S330*a*, S330*b*, S330*c*).

The compressor controller 180 may determine whether the changed cooling capacity variable is more than a cooling capacity upper limit value (S360*a*), or may determine whether the changed cooling capacity variable is less than a cooling capacity lower limit value (S360*b*).

For instance, when the changed cooling capacity variable is more than the cooling capacity upper limit value, the compressor controller 180 may control the cooling capacity variable such that a top dead center of the piston may move up to a region close to one end of the cylinder which faces a discharge unit. That is, the compressor controller 180 may convert a driving mode of the linear motor into a first driving mode when the changed cooling capacity variable is more than the cooling capacity variable upper limit value.

As another example, when the changed cooling capacity variable is less than the cooling capacity variable lower limit value, the compressor controller 180 may set the cooling capacity variable to the cooling capacity variable lower limit value.

That is, when a gap between a phase difference and a reference phase difference is large, the compressor controller 180 may increase a change width of a cooling capacity. On the other hand, when the gap between the phase difference and the reference phase difference is small, the compressor controller 180 may decrease the change width of the cooling capacity.

Figure 4A:
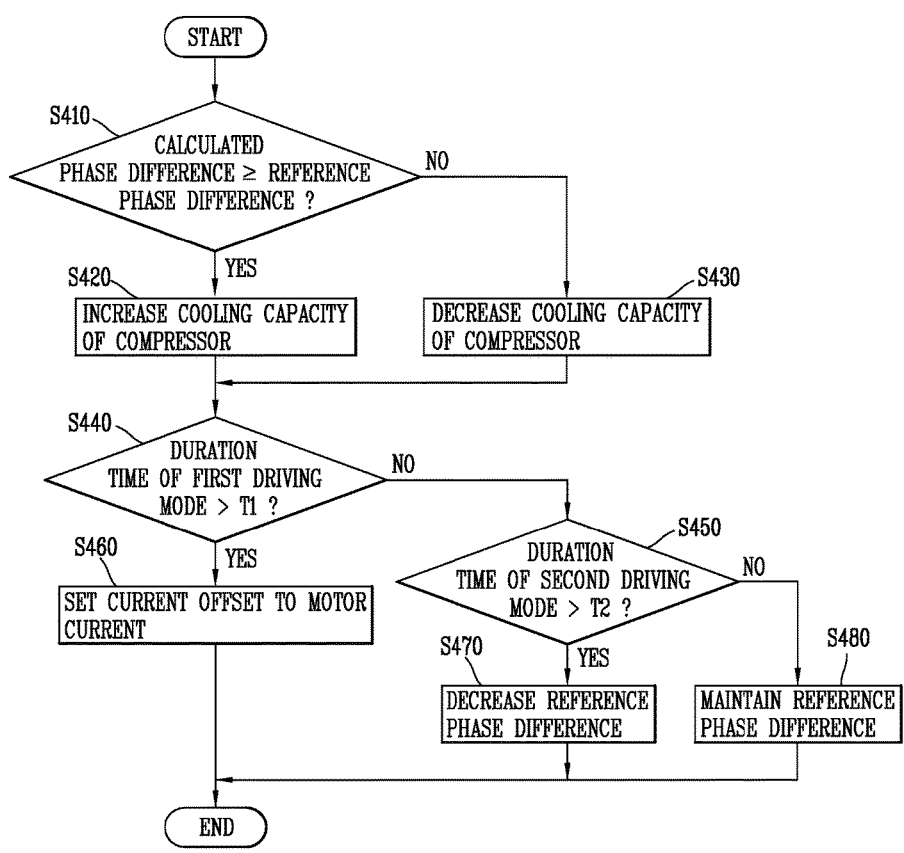

FIG. 4A illustrates an embodiment related to a method for controlling a compressor according to the present invention.

Although not shown in FIG. 4A, the compressor controller 180 may execute detecting at least one of a motor current and a motor voltage (S210), calculating a stroke based on the detected motor current and motor voltage (S220), and calculating a phase difference between the motor current or the motor voltage and the stroke (S230).

As shown in FIG. 4A, the compressor controller 180 may compare a calculated phase difference with a reference phase difference (S410). Then, the compressor controller 180 may increase (S420) or decrease (S430) a cooling capacity of the compressor according to a comparison result obtained in S410. Although not shown in FIG. 4A, the compressor controller 180 may maintain the cooling capacity of the compressor according to the comparison result obtained in S410.

Referring to FIG. 4A, the compressor controller 180 may detect information related to a driving mode of the linear motor. Referring to FIG. 4B, the driving mode of the linear motor may be defined as a first driving mode, a second driving mode and a third driving mode. More specifically, the driving mode of the linear motor may be classified according to an operation section of the piston or a cooling capacity of the compressor.

For instance, when the linear motor is driven in the first driving mode, the compressor controller 180 may drive the linear motor such that the piston of the linear motor may move to a region close to one end of the cylinder which faces the discharge unit. That is, a top dead center of the piston of the linear motor driven in the first driving mode may be positioned at one end of the cylinder, and the one end may correspond to one of two ends of the cylinder where the discharge unit is installed.

As another example, when the linear motor is driven in the second driving mode, the compressor controller 180 may drive the linear motor such that the piston of the linear motor may be spaced from the discharge unit and may move up to a region inside the cylinder. That is, the top dead center of the piston of the linear motor driven in the second driving mode may be positioned in the cylinder. Thus, a cooling capacity of the linear motor driven in the second driving mode may be smaller than that of the linear motor driven in the first driving mode.

As another example, when the linear motor is driven in the third driving mode, the compressor controller 180 may generate an asymmetric motor current by setting a current offset to the motor current. Thus, the compressor controller 180 may drive the linear motor such that the piston of the linear motor may reciprocate up to a region disposed outside the cylinder. That is, the top dead center of the piston of the linear motor driven in the third driving mode may be positioned outside the cylinder. This may cause the piston of the linear motor driven in the third driving mode, to collide with the discharge unit during the reciprocation.

As shown in FIG. 4A, if the linear motor is driven in the first driving mode, the compressor controller 180 may detect information related to a duration time of the first driving mode. Further, the compressor controller 180 may determine whether the duration time of the first driving mode of the linear motor is more than a first time interval (T1) (S440).

If the linear motor is driven in the first driving mode for more than the first time interval (T1), the compressor controller 180 may drive the linear motor such that the cooling capacity of the compressor may be increased. More specifically, the compressor controller 180 may set a current offset to the motor current (S460). That is, if the linear motor is driven in the first driving mode for more than the first time interval (T1), the compressor controller 180 may drive the linear motor based on the asymmetric motor current.

For instance, if the linear motor is driven in the first driving mode for more than the first time interval (T1), the compressor controller 180 may convert the first driving mode into a third driving mode by setting a current offset to the motor current. If a third time interval passes after the first driving mode of the linear motor has been converted into the third driving mode, the compressor controller 180 may re-convert the third driving mode into the first or second driving mode.

The compressor may further include an asymmetric current generator configured to generate an asymmetric motor current by applying a current offset to the motor current. The compressor controller 180 may control the asymmetric current generator in order to set the current offset.

As shown in FIG. 4A, if the linear motor is driven in the second driving mode, the compressor controller 180 may detect information related to a duration time of the second driving mode. Further, the compressor controller 180 may determine whether the duration time of the second driving mode of the linear motor is more than a second time interval (T2) (S450).

More specifically, if it is determined that the duration time of the first driving mode is less than the first time interval (T1), and if the linear motor is driven in the second driving mode, the compressor controller 180 may compare the duration time of the second driving mode with the second time interval (T2).

If the linear motor is driven in the second driving mode for more than the second time interval (T2), the compressor controller 180 may decrease the reference phase difference (S470). That is, if the linear motor is driven in the second driving mode for more than the second time interval (T2), the compressor controller 180 may decrease the reference phase difference to increase the cooling capacity of the compressor.

On the other hand, if the linear motor is driven in the second driving mode for less than the second time interval (T2), the compressor controller 180 may maintain the reference phase difference (S480).

As shown in FIG. 4B, if the linear motor is driven in the second driving mode for more than the second time interval (T2), the compressor controller 180 may decrease the reference phase difference to gradually increase the cooling capacity of the compressor. If the linear motor is converted into the first driving mode from the second driving mode, the compressor controller 180 may determine whether the first driving mode is maintained for more than the first time interval (T1). Further, if the linear motor is maintained for more than the first time interval (T1) in the first driving mode, the compressor controller 180 may convert the first driving mode of the linear motor into the third driving mode.

FIG. 4C illustrates graphs indicating variables related to the control method shown in FIG. 4A.

Referring to FIG. 4C, the left upper graph illustrates a phase difference ($\theta$ix) according to a position of a top dead center of the piston, and a change of a motor power when an external temperature (RT) is 15° C. And the left lower graph illustrates a change of a gas constant (Kgas) according to the position of the top dead center of the piston when the external temperature (RT) is 15° C.

Referring to FIG. 4C, the compressor controller 180 may drive the linear motor based on information related to a load condition. That is, the compressor controller 180 may compare a variable related to a motor power with a variable related to a phase difference in a constant load condition, with respect to a position change of a top dead center of the piston, thereby searching a crossing point of the two variables. In this case, the compressor controller 180 may generate the variable related to a phase difference by multiplying a phase difference by a constant ($\beta$), in order to compare motor powers having different unit values with the phase difference.

That is, as shown in FIG. 4C, the compressor controller 180 may calculate a variable ($\beta(180-\theta ix)$) based on a phase difference ($\theta$ix) between a motor current and a stroke, and then compare the calculated variable ($\beta(180-\theta ix)$) with the variable related to a motor power, thereby detecting a crossing point of the two variables.

If the linear motor is driven in the second driving mode, the compressor controller 180 may control a stoke of the piston such that a top dead center of the piston may correspond to the detected crossing point.

That is, the compressor controller 180 may detect a stroke value where the changed phase difference and the power are consistent with each other, according to a stroke change of the linear motor. Then, the compressor controller 180 may set the power corresponding to the detected stroke value as an input power of the linear motor.

Referring to the graphs of FIG. 4C, the X-axis means a position of a top dead center of the piston, and the Y-axis means a variable ($\beta(180-\theta ix)$) or a motor power. In a case where a top dead center of the piston is positioned at a region close to one end of the cylinder which faces the discharge unit, the top dead center may correspond to '0' on the X-axis.

The right upper and lower graphs illustrate a phase difference ($\theta ix$) according to a position of a top dead center of the piston, and a change of a motor power when an external temperature (RT) is 35° C.

When the two graphs shown on the left side of FIG. 4C are compared with the two graphs shown on the right side of FIG. 4C, the crossing point of the variable related to a motor power and the variable related to a phase difference is gradually moved to the right side in a constant load condition.

Figure 4D:
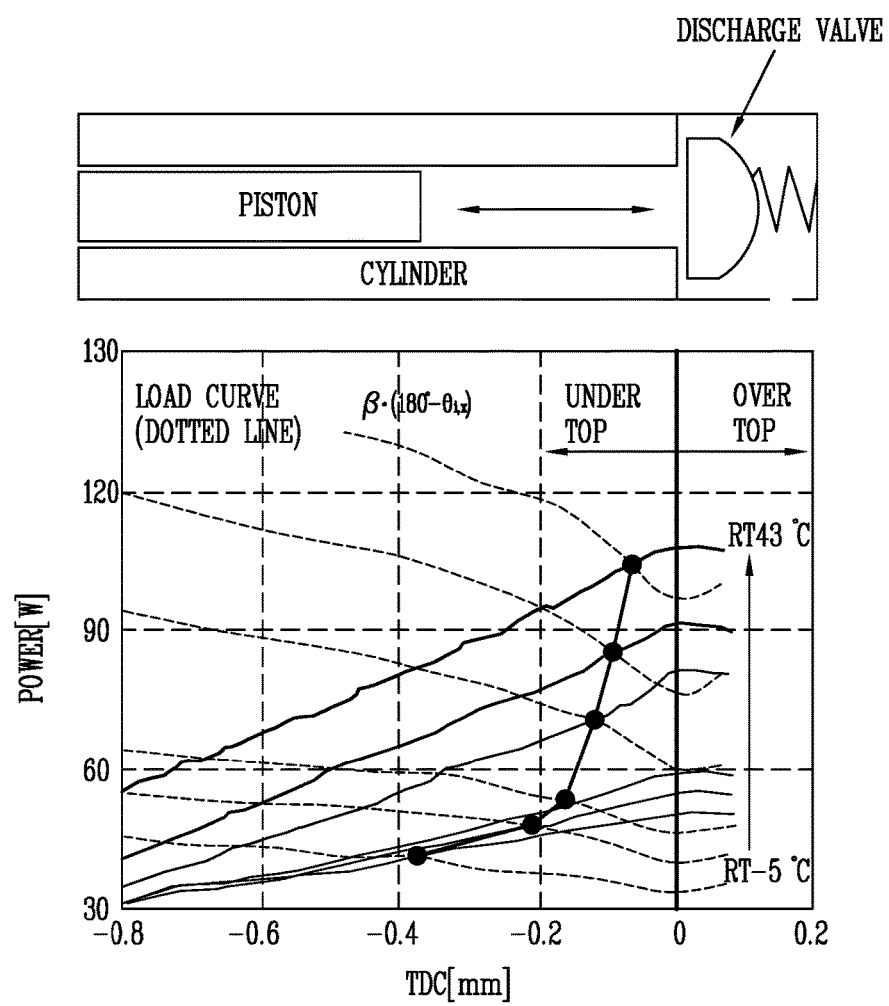
Figure 4E:
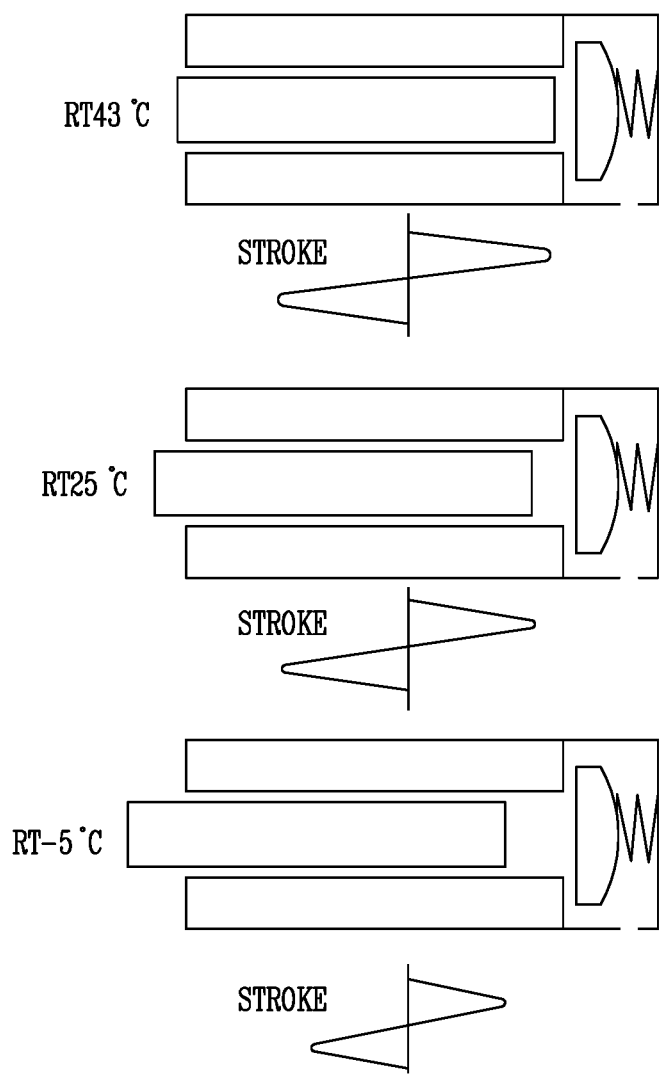

FIG. 4D illustrates a graph formed by connecting the above crossing points to each other under a plurality of load conditions. FIG. 4E illustrates an embodiment of the motor driven to correspond to the detected crossing points under a plurality of load conditions.

Figure 4F:
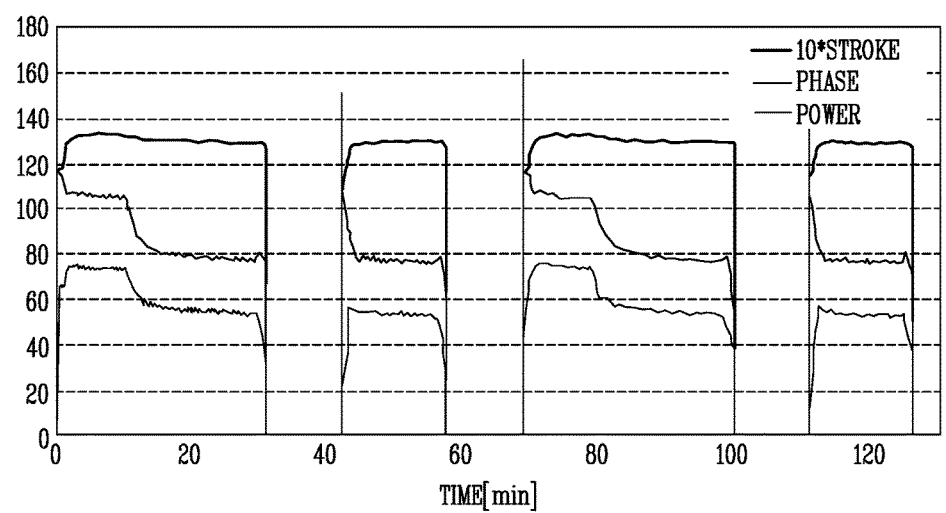

FIG. 4F is a graph illustrating a change of a stroke, a phase, and a motor power of the compressor according to the present invention.

As shown in FIG. 4F, the compressor controller of the present invention may change a stoke and a motor power according to a load, without receiving information related to a stroke command from the controller of the apparatus including the compressor.

FIG. 5A is a flowchart illustrating an embodiment related to a method for controlling a compressor according to the present invention.

Although not shown in FIG. 5A, the compressor controller 180 may detect at least one of a motor current and a motor voltage (S210), calculate a stroke based on the detected motor voltage and motor current (S220), and calculate a phase difference between the motor current or the motor voltage and the stroke (S230).

As shown in FIG. 5A, the compressor controller 180 may compare the calculated phase difference with a reference phase difference (S510). The compressor controller 180 may increase (S520) or decrease (S530) a cooling capacity of the compressor according to a comparison result obtained in S510. Although not shown in FIG. 5A, the compressor controller 180 may maintain the cooling capacity of the compressor according to the comparison result obtained in S510.

The compressor controller 180 may detect information related to a driving rate of the compressor (S540). The compressor controller 180 may change a reference phase difference based on the detected driving rate.

More specifically, the compressor controller 180 may detect a driving rate of the compressor at predetermined time intervals. For instance, the compressor controller 180 may detect a driving rate of the compressor whenever a single control period of the compressor is completed. The single control period of the compressor may be determined based on various aspects of the compressor.

Alternatively, the compressor controller 180 may detect a driving rate of the compressor based on a time duration for which the linear motor has been driven (Ton) and a time duration for which the linear motor has been stopped (Toff), for a predetermined time period. For instance, the compressor controller 180 may calculate a driving rate of the compressor by dividing the time duration for which the linear motor has been driven (Ton), by the sum between the time duration (Ton) and the time duration (Toff).

The time period by which the compressor controller 180 detects a driving rate of the compressor may be longer or shorter than a time period by which the calculated phase difference is compared with the reference phase difference (S510). In an embodiment, the compressor controller 180 may compare the calculated phase difference with the reference phase difference at time intervals of 3 minutes (S510), and may detect a driving rate of the compressor at time intervals (periods) of 10 minutes (S540).

Next, the compressor controller 180 may compare the detected driving rate with a first reference driving rate (S550). More specifically, the compressor controller 180 may determine whether the detected driving rate is larger than the first reference driving rate.

If the detected driving rate is larger than the first reference driving rate, the compressor controller 180 may decrease the reference phase difference (S570).

Further, the compressor controller 180 may compare the detected driving rate with a second reference driving rate (S560). More specifically, the compressor controller 180 may determine whether the detected driving rate is smaller than the second reference driving rate. In this case, the first reference driving rate may be larger than the second reference driving rate.

If the detected driving rate is smaller than the second reference driving rate, the compressor controller 180 may increase the reference phase difference (S580).

If the detected driving rate is smaller than the first reference driving rate but is larger than the second reference driving rate, the compressor controller 180 may maintain the reference phase difference (S590).

FIG. 5B is a graph illustrating variables related to the control method shown in FIG. 5A.

As shown in FIG. 5B, at a section (①), a driving rate of the compressor is larger than the first reference driving rate. Accordingly, the compressor controller 180 may reduce the reference phase difference after the section (①). That is, the compressor controller 180 may reduce the reference phase difference after the section (①), thereby increasing a cooling capacity of the compressor.

Referring to FIG. 5B, at a section (②), the driving rate of the compressor is smaller than the second reference driving rate. Accordingly, the compressor controller 180 may increase the reference phase difference after the section (②). That is, the compressor controller 180 may increase the reference phase difference after the section (②), thereby decreasing the cooling capacity of the compressor.

Referring to FIG. 5B, at a section (③), the driving rate of the compressor is larger than the second reference driving rate, but is smaller than the first reference driving rate. Accordingly, the compressor controller 180 may maintain the reference phase difference after the section (③).

FIG. 6 is a flowchart illustrating an embodiment related to a method for controlling a compressor according to the present invention.

Referring to FIG. 6, a compressor installed at an apparatus including a refrigeration cycle may include a piston which reciprocates in a cylinder, a linear motor configured to provide a driving force to move the piston, a sensor configured to sense a motor current of the linear motor, and a compressor controller configured to detect information related to a load of the apparatus, in a separated manner from a controller which controls a body of the apparatus.

In this case, the compressor controller 180 may calculate a phase difference between a stroke of the piston and the sensed motor current. The compressor controller 180 may compare the calculated phase difference with a reference phase difference, and may control a driving of the linear motor in correspondence to a load detected according to a result of the comparison. The compressor controller 180 may detect information related to a driving mode and a driving time of the linear motor, and may control the cooling capacity of the compressor based on the detected information.

Although not shown in FIG. 6, the compressor controller 180 may detect at least one of a motor current and a motor voltage (S210), calculate a stroke based on the detected motor voltage and motor current (S220), and calculate a phase difference between the motor current or the motor voltage and the stroke (S230).

As shown in FIG. 6, the compressor controller 180 may compare the calculated phase difference with a reference phase difference (S610). The compressor controller 180 may increase (S620a) or decrease (S620b) the cooling capacity of the compressor according to a comparison result obtained in S610. Although not shown in FIG. 6, the compressor controller 180 may maintain the cooling capacity of the compressor according to the comparison result obtained in S610.

Next, the compressor controller 180 may detect a driving mode of the linear motor, and may control the cooling capacity of the compressor based on a driving time of the detected driving mode, or based on a time duration for which the driving mode has been maintained.

As shown in FIG. 6, if the linear motor is driven in a first driving mode, the compressor controller 180 may detect information related to a duration time of the first driving mode. Further, the compressor controller 180 may determine whether the duration time of the first driving mode of the linear motor is more than a first time interval (T1) (S630a).

If the linear motor is driven in the first driving mode for more than the first time interval (T1), the compressor controller 180 may drive the linear motor such that the cooling capacity of the compressor may be increased. More specifically, the compressor controller 180 may set a current offset to the motor current (S640a). That is, if the linear motor is driven in the first driving mode for more than the first time interval (T1), the compressor controller 180 may drive the linear motor based on an asymmetric motor current.

For instance, if the linear motor is driven in the first driving mode for more than the first time interval (T1), the compressor controller 180 may convert the first driving mode into a third driving mode by setting a current offset to the motor current. If a third time interval passes after the first driving mode of the linear motor has been converted into the third driving mode, the compressor controller 180 may re-convert the third driving mode into the first or second driving mode.

The compressor may further include an asymmetric current generator configured to generate an asymmetric motor current by applying a current offset to the motor current. The compressor controller 180 may control the asymmetric current generator in order to set the current offset.

As shown in FIG. 4A, if the linear motor is driven in the second driving mode, the compressor controller 180 may detect information related to a duration time of the second driving mode. Further, the compressor controller 180 may determine whether the duration time of the second driving mode of the linear motor is more than a second time interval (T2) (S630b).

More specifically, if it is determined that the linear motor is driven in the first driving mode for less than the first time interval (T1), and then if the linear motor is driven in the second driving mode, the compressor controller 180 may compare a duration time of the second driving mode with the second time interval (T2).

If the linear motor is driven in the second driving mode for more than the second time interval (T2), the compressor controller 180 may decrease the reference phase difference (S640b). That is, if the linear motor is driven in the second driving mode for more than the second time interval (T2), the compressor controller 180 may decrease the reference phase difference to increase the cooling capacity of the compressor.

On the other hand, if the linear motor is driven in the second driving mode for less than the second time interval (T2), the compressor controller 180 may maintain the reference phase difference (S640c).

Next, the compressor controller 180 may compare a detected driving rate with a first reference driving rate (S650a). More specifically, the compressor controller 180 may determine whether the detected driving rate is larger than the first reference driving rate.

If the detected driving rate is larger than the first reference driving rate, the compressor controller 180 may decrease the reference phase difference (S660a).

Further, the compressor controller 180 may compare the detected driving rate with a second reference driving rate (S650b). More specifically, the compressor controller 180 may determine whether the detected driving rate is smaller than the second reference driving rate. In this case, the first reference driving rate may be larger than the second reference driving rate.

If the detected driving rate is smaller than the second reference driving rate, the compressor controller 180 may increase the reference phase difference (S660b).

If the detected driving rate is smaller than the first reference driving rate but is larger than the second reference driving rate, the compressor controller 180 may maintain the reference phase difference (S660c).

FIG. 7 is a flowchart illustrating an embodiment related to a method for controlling a compressor according to the present invention.

The compressor controller 180 may determine whether a phase difference between a motor current and a stroke is larger than a reference phase difference (S710). If it is determined that the phase difference is larger than the reference phase difference, the compressor controller 180 may decrease a driving frequency of the compressor (S730).

The compressor controller 180 may determine whether the phase difference between the motor current and the stroke is smaller than the reference phase difference (S720). If it is determined that the phase difference is smaller than the reference phase difference, the compressor controller 180 may increase the driving frequency of the compressor (S740).

The compressor controller 180 may determine whether the phase difference between the motor current and the stroke is equal to the reference phase difference. If it is determined that the phase difference is equal to the reference phase difference, the compressor controller 180 may maintain the driving frequency of the compressor (S750).

Further, the compressor controller 180 may determine whether a load has been increased (S760, S770).

If it is determined that a load has been increased, the compressor controller 180 may increase a power of the compressor (S780). On the other hand, if it is determined that a load has been decreased, the compressor controller 180 may decrease the power of the compressor (S790).

FIGS. 8A to 8C are graphs illustrating variables related to the control method shown in FIG. 7.

As shown in FIG. 8A, a phase difference (θix) between a motor current and a stroke, and a power consumed by the motor may be proportional to each other. That is, the compressor controller 180 may control the cooling capacity of the compressor by controlling a power applied to the motor.

The compressor controller 180 according to an embodiment of the present invention may detect information related to a load of an apparatus including the compressor, in a separated manner from a controller which controls a body of the apparatus. Further, the compressor controller 180 may calculate a phase difference between a stroke of the piston and a motor current, and may control the linear motor such that the calculated phase difference may be within a range of a reference phase difference.

That is, the compressor controller 180 may compare the calculated phase difference with the reference phase difference, and may control a stroke of the linear motor based on a result of the comparison. More specifically, if it is determined that the calculated phase difference is larger than the reference phase difference, the compressor controller may increase the stroke of the linear motor. On the other hand, if it is determined that the calculated phase difference is smaller than the reference phase difference, the compressor controller may decrease the stroke of the linear motor.

In an embodiment, the compressor controller may control a stroke of the linear motor such that a calculated phase difference may be within a numerical range related to a reference phase difference. Here, the numerical range may include the reference phase difference.

If the calculated phase difference is out of the preset numerical range, the compressor controller may control a driving frequency of the linear motor such that a resonant driving of the linear motor may be maintained.

For instance, if the calculated phase difference is larger than a cooling capacity upper limit value of the preset numerical range, the compressor controller may decrease the driving frequency of the linear motor. On the other hand, if the calculated phase difference is smaller than a cooling capacity lower limit value of the preset numerical range, the compressor controller may increase the driving frequency of the linear motor.

The compressor controller may compare the calculated phase difference with the reference phase difference, and may control an input power applied to the motor based on a result of the comparison. And the compressor controller may compare the calculated phase difference with the reference phase difference, and may control the driving frequency of the motor based on a result of the comparison.

In another embodiment, the compressor controller may detect information related to a load of an apparatus including the compressor, in a separated manner from a controller which controls a body of the apparatus. The compressor controller may calculate a driving rate of the linear motor, and may control a driving of the linear motor based on the calculated driving rate.

In this case, the compressor controller may compare the calculated driving rate with a reference driving rate, and may control a power applied to the linear motor based on a result of the comparison.

More specifically, if the calculated driving rate is larger than the reference driving rate, the compressor controller may increase the power applied to the linear motor. On the other hand, if the calculated driving rate is smaller than the reference driving rate, the compressor controller may decrease the power applied to the linear motor.

If the calculated driving rate is within the preset numerical range, the compressor controller may maintain the power applied to the linear motor. Here, the reference driving rate may be within the preset numerical range.

In another embodiment, if the linear motor is being driven, the compressor controller may detect a time duration for which the linear motor has been driven, and may detect information related to a load of the refrigerator based on the detected time duration. And the compressor controller may control a driving of the linear motor based on the detected information.

In another embodiment, the compressor controller may calculate a phase difference between a stroke of the piston and a motor current, and may control the driving frequency of the linear motor such that the calculated phase difference may be maintained as the reference phase difference. And the compressor controller may change the power applied to the linear motor according to a load change of the refrigerator.

In another embodiment, the compressor controller may detect information related to a load of an apparatus including the compressor, in a separated manner from a controller which controls a body of the apparatus. And the compressor controller may change the power applied to the linear motor according to a change of the load.

If the detected load is increased, the compressor controller may increase the power applied to the linear motor. On the other hand, if the detected load is decreased, the compressor controller may decrease the power applied to the linear motor.

For instance, the compressor controller may control a stroke of the piston such that the power applied to the linear motor may be changed. Further, the compressor controller may change the driving frequency of the linear motor such that the linear motor may execute a resonant driving, after the stroke of the piston has been changed.

The compressor controller may detect a driving rate of the linear motor, and may determine whether a load has been increased or decreased based on the detected driving rate. The compressor controller may determine whether a load has been increased or decreased, based on a phase difference between a motor current and a stroke of the piston. The compressor controller may determine a driving mode of the linear motor, detect a driving time of the determined driving mode, and determine whether a load has been increased or decreased based on the driving mode and the driving time.

Referring to FIG. 8B, at a section 801 where a phase difference between a motor current and a stroke is increased, the compressor controller may increase the stroke of the piston in order to increase the power of the linear motor.

On the contrary, at a section 803 where the phase difference between the motor current and the stroke is decreased, the compressor controller may decrease the stroke of the piston in order to decrease the power of the linear motor.

At a section 802 where the phase difference is larger than a reference phase difference (e.g., 90+δ°), the compressor controller may maintain a resonant driving of the linear motor by reducing the driving frequency of the linear motor.

On the contrary, at a section 804 where the phase difference is smaller than the reference phase difference (e.g., 90−δ°), the compressor controller may maintain the resonant driving of the linear motor by increasing the driving frequency of the linear motor.

Once the above compressor control processes are executed, as shown in FIG. 8C, power consumption by the linear motor is increased according to a load change.

As shown in FIG. 8C, as a load of an apparatus including the compressor is increased, the compressor controller may gradually increase a power of the linear motor in order to increase the cooling capacity of the compressor. Here, the compressor controller 180 may maintain the resonant driving of the linear motor by increasing or decreasing the driving frequency of the linear motor. That is, the compressor controller 180 may control the linear motor such that the phase difference between the motor current and the stroke may be within a numerical range related to the reference phase difference (e.g., 90−δ°~90+δ°).

The compressor and the method for controlling the same according to the present invention may have the following advantages.

Firstly, even in a refrigerator having no controller or a refrigerator having no cycle matching function, driving efficiency of the compressor may be optimized.

Secondly, even when the compressor does not receive a control signal related to a driving of the linear motor installed at the compressor from the controller of the refrigerator, the compressor may execute an optimum driving, and may be stably controlled.

Thirdly, an unnecessary input of a stroke and a power is prevented, and a cooling capacity change amount required to control a variable cooling capacity is not input. This may enhance user's convenience and a stability of the system.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

Therefore, an aspect of the detailed description is to provide a compressor applied to a refrigerator not having a cycle matching function or a refrigerator not including a controller, and capable of controlling a driving of a linear motor by the compressor itself, and a method for controlling the same.

Another aspect of the detailed description is to provide a compressor which determines a load of a refrigerator by itself, and which is driven according to the determined load, and a method for controlling the same.

Another aspect of the detailed description is to provide a compressor capable of detecting a load change of a refrigerator in an independent manner from a controller of the refrigerator, and capable of maintaining a driving efficiency, and a method for controlling the same.

To achieve these and other advantages and in accordance with the purpose of this specification, as embodied and broadly described herein, there is provided a compressor installed at an apparatus including a refrigeration cycle, the compressor including: a piston which reciprocates in a cylinder; a linear motor configured to provide a driving force to move the piston; a sensor configured to sense a motor current of the linear motor; and a compressor controller configured to detect information related to a load of the apparatus, in a separated manner from a controller which controls a body of the apparatus, wherein the compressor controller calculates a phase difference between a stroke of the piston and the sensed motor current, and wherein the compressor controller controls a driving of the linear motor in correspondence to the detected load, such that the calculated phase difference is within a range of a reference phase difference.

In an embodiment, the compressor controller may compare the calculated phase difference with the reference phase difference, and may control a stroke of the linear motor based on a comparison result.

In an embodiment, if the calculated phase difference is larger than the reference phase difference, the compressor controller may increase a stroke of the linear motor.

In an embodiment, if the calculated phase difference is smaller than the reference phase difference, the compressor controller may decrease a stroke of the linear motor.

In an embodiment, the compressor controller may control a stroke of the linear motor such that the calculated phase difference may be within a numerical range related to the reference phase difference, and the numerical range may include the reference phase difference.

In an embodiment, if the calculated phase difference is out of the numerical range, the compressor controller may control a driving frequency of the linear motor such that a resonant driving of the linear motor may be maintained.

In an embodiment, if the calculated phase difference is larger than an upper limit value of the preset numerical range, the compressor controller may decrease the driving frequency of the linear motor. And if the calculated phase difference is smaller than a lower limit value of the preset numerical range, the compressor controller may increase the driving frequency of the linear motor.

In an embodiment, the compressor controller may compare the calculated phase difference with the reference phase difference, and may control an input power applied to the linear motor based on a comparison result.

In an embodiment, the compressor controller may compare the calculated phase difference with the reference phase difference, and may control a driving frequency of the linear motor based on a comparison result.

To achieve these and other advantages and in accordance with the purpose of this specification, as embodied and broadly described herein, there is also provided a compressor installed at an apparatus including a refrigeration cycle, the compressor including: a piston which reciprocates in a cylinder; a linear motor configured to provide a driving force to move the piston; a sensor configured to sense a motor current of the linear motor; and a compressor controller configured to detect information related to a load of the apparatus, in a separated manner from a controller which controls a body of the apparatus, wherein the compressor controller calculates a driving rate of the linear motor, and controls a driving of the linear motor based on the calculated driving rate.

In an embodiment, the compressor controller may compare the calculated driving rate with a reference driving rate, and may control a power applied to the linear motor based on a comparison result.

In an embodiment, if the calculated driving rate is larger than the reference driving rate, the compressor controller may increase the power applied to the linear motor. And if the calculated driving rate is smaller than the reference driving rate, the compressor controller may decrease the power applied to the linear motor.

In an embodiment, if the calculated driving rate is within a preset numerical range, the compressor controller may maintain the power applied to the linear motor. And the reference driving rate may be included in the preset numerical range.

To achieve these and other advantages and in accordance with the purpose of this specification, as embodied and broadly described herein, there is also provided a compressor installed at an apparatus including a refrigeration cycle, the compressor including: a piston which reciprocates in a cylinder; a linear motor configured to provide a driving force to move the piston; and a compressor controller configured to detect information related to a load of the apparatus, in a separated manner from a controller which controls a body of the apparatus, wherein if the linear motor is being driven, the compressor controller calculates a duration time for which the driving of the linear motor has been maintained, and wherein the compressor controller detects information related to the load of the apparatus based on the calculated duration time, and controls a driving of the linear motor based on the detected information.

To achieve these and other advantages and in accordance with the purpose of this specification, as embodied and broadly described herein, there is also provided a compressor installed at an apparatus including a refrigeration cycle, the compressor including: a piston which reciprocates in a cylinder; a linear motor configured to provide a driving force to move the piston; a sensor configured to sense a motor current of the linear motor; and a compressor controller configured to detect information related to a load of the apparatus, in a separated manner from a controller which controls a body of the apparatus, wherein the compressor controller calculates a phase difference between a stroke of the piston and the sensed motor current, and controls a driving frequency of the linear motor such that the calculated phase difference is maintained as a reference phase difference, and wherein the compressor controller changes a power applied to the linear motor according to a change of the load of the apparatus.

To achieve these and other advantages and in accordance with the purpose of this specification, as embodied and broadly described herein, there is also provided a compressor installed at an apparatus including a refrigeration cycle, the compressor including: a piston which reciprocates in a cylinder; a linear motor configured to provide a driving force to move the piston; and a compressor controller configured to detect information related to a load of the apparatus, in a separated manner from a controller which controls a body of the apparatus, wherein the compressor controller changes a power applied to the linear motor according to a change of the load.

In an embodiment, if the detected load is increased, the compressor controller may increase the power applied to the linear motor. And if the detected load is decreased, the compressor controller may decrease the power applied to the linear motor.

In an embodiment, the compressor controller may change a driving frequency of the linear motor such that the linear motor may perform a resonant driving, after a stroke of the piston is changed.

In an embodiment, the compressor controller may detect a driving rate of the linear motor, and may determine whether the load of the apparatus has been increased or decreased based on the detected driving rate.

In an embodiment, the compressor may further include a sensor configured to sense a motor current of the linear motor, and the compressor controller may determine whether the load of the apparatus has been increased or decreased based on a phase difference between the motor current and the stroke of the piston.

In an embodiment, the compressor controller may determine a driving mode of the linear motor, detect a driving time of the determined driving mode, and determine whether the load has been increased or decreased based on the driving mode and the driving time.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A compressor to be provided at an apparatus having a refrigeration cycle, the compressor comprising:
    a piston that moves in a cylinder;
    a linear motor configured to move the piston in the cylinder;
    a sensor configured to sense a motor current of the linear motor; and
    a compressor controller configured to determine information related to a load of the apparatus, wherein the compressor controller is separated from a controller to control components of a body of the apparatus,
    wherein the compressor controller is configured to determine a phase difference between the sensed motor current and a stroke of the piston in the linear motor, and
    wherein the compressor controller compares the determined phase difference with a reference phase difference, and the compressor controller controls a stroke of the linear motor based on a result of the comparing of the determined phase difference and the reference phase difference, and
    wherein the compressor controller determines a driving rate of the linear motor at every predetermined time period, and the compressor controller changes the reference phase difference according to the determined driving rate.

2. The compressor of claim 1, wherein when the compressor controller determines that the phase difference is larger than the reference phase difference, the compressor controller controls the linear motor to increase a stroke of the linear motor.

3. The compressor of claim 1, wherein when the compressor controller determines that the phase difference is less than the reference phase difference, the compressor controller controls the linear motor to decrease a stroke of the linear motor.

4. The compressor of claim 1, wherein the compressor controller controls the stroke of the linear motor such that the determined phase difference is within a preset numerical range related to the reference phase difference, and
wherein the numerical range includes the reference phase difference.

5. The compressor of claim 4, wherein when the determined phase difference is outside of the numerical range, the compressor controller controls a driving frequency of the linear motor such that a resonant driving of the linear motor is maintained.

6. The compressor of claim 5, wherein when the determined phase difference is larger than an upper limit of the preset numerical range, the compressor controller controls the linear motor to decrease the driving frequency of the linear motor, and
wherein when the determined phase difference is less than a lower limit of the preset numerical range, the compressor controller controls the linear motor to increase the driving frequency of the linear motor.

7. The compressor of claim 1, wherein the compressor controller compares the determined phase difference with a reference phase difference, and the compressor controller controls an input power applied to the linear motor based on a result of the comparing of the determined phase difference and the reference phase difference.

8. The compressor of claim 1, wherein the compressor controller compares the determined phase difference with the reference phase difference, and the compressor controller controls a driving frequency of the linear motor based on a result of the comparing of the determined phase difference and the reference phase difference.

9. The compressor of claim 1, wherein the compressor controller compares the determined driving rate with a reference driving rate, and the compressor controller controls a power applied to the linear motor based on a result of the comparing of the determined driving rate and the reference driving rate.

10. The compressor of claim 9, wherein when the compressor controller determines that the determined driving rate is larger than the reference driving rate, the compressor controller increases the power applied to the linear motor, and
wherein when the compressor controller determines that the determined driving rate is less than the reference driving rate, the compressor controller decreases the power applied to the linear motor.

11. The compressor of claim 10, wherein when the determined driving rate is within a preset numerical range, the compressor controller maintains the power applied to the linear motor, and
wherein the reference driving rate is included in the preset numerical range.

12. The compressor of claim 1, wherein the compressor controller calculates the driving rate of the compressor based on a time duration for which the linear motor has been driven and a time duration for which the linear motor has been stopped for the predetermined time period.

* * * * *